(12) United States Patent
Yamakado et al.

(10) Patent No.: US 7,703,011 B2
(45) Date of Patent: Apr. 20, 2010

(54) DIGITAL CONTENT CREATION SYSTEM, DIGITAL CONTENT CREATION METHOD, AND PROGRAM PRODUCT

(75) Inventors: Hitoshi Yamakado, Hino (JP); Atsushi Nagahara, Chino (JP)

(73) Assignee: Seiko Epson Corporation (JP)

( * ) Notice: Subject to any disclaimer, the term of this patent is extended or adjusted under 35 U.S.C. 154(b) by 713 days.

(21) Appl. No.: 11/598,835

(22) Filed: Nov. 13, 2006

(65) Prior Publication Data
US 2007/0126793 A1 Jun. 7, 2007

(30) Foreign Application Priority Data
Nov. 14, 2005 (JP) .............. 2005-328901

(51) Int. Cl.
*H04N 1/387* (2006.01)
(52) U.S. Cl. .................. 715/243; 715/244; 345/620; 345/629; 345/635
(58) Field of Classification Search ......... 715/243–247, 715/252, 765–766
See application file for complete search history.

(56) References Cited

U.S. PATENT DOCUMENTS

| | | | |
|---|---|---|---|
| 7,162,102 B2 * | 1/2007 | Cahill et al. ............ | 382/288 |
| 7,356,760 B2 * | 4/2008 | Jaeger ................... | 715/246 |
| 7,421,125 B1 * | 9/2008 | Rees ..................... | 382/181 |
| 2004/0003350 A1 * | 1/2004 | Simmons et al. ........ | 715/517 |
| 2004/0125140 A1 * | 7/2004 | Bell et al. .............. | 345/765 |
| 2004/0205624 A1 * | 10/2004 | Lui et al. ............... | 715/525 |
| 2004/0225961 A1 * | 11/2004 | Ohashi et al. .......... | 715/517 |
| 2004/0261038 A1 * | 12/2004 | Ording et al. .......... | 715/792 |
| 2005/0172225 A1 * | 8/2005 | Kobashi et al. ......... | 715/517 |
| 2005/0192956 A1 * | 9/2005 | Evans .................... | 707/5 |
| 2006/0078224 A1 * | 4/2006 | Hirosawa ............... | 382/284 |
| 2007/0074109 A1 | 3/2007 | Nagahara et al. | |

FOREIGN PATENT DOCUMENTS

| | | |
|---|---|---|
| JP | 04-218864 | 8/1992 |
| JP | 09-311857 | 12/1997 |
| JP | 10-154174 | 6/1998 |
| JP | 2005-216180 | 8/2005 |
| JP | 2007-172573 | 7/2007 |

* cited by examiner

*Primary Examiner*—Doug Hutton
*Assistant Examiner*—Andrew R Dyer
(74) *Attorney, Agent, or Firm*—Harness, Dickey & Pierce, P.L.C.

(57) ABSTRACT

A digital content creation device includes a processor and a storage device. The storage device stores a content database including digital content sets. The processor selects a target digital content set for processing; determines, based on a template, a layout for more than one target selected digital content sets; detects, based on processor generated overlap information, an overlapping region of the more than one target selected digital content sets; determines, based on processor generator importance information, at least one target selected digital content set for moving; determines a move direction parallel to a line connecting an overlapping region centroid and a move-target digital content set centroid allowing the centroids to be separated; calculates a move-distance to remove the overlap between the move-target digital content set and a quadrangle circumscribed on the overlapping region; and moves the move-target digital content set in the move direction by the move distance.

16 Claims, 16 Drawing Sheets

FIRST PAGE

IMAGE 1    IMAGE 2

TEXT 1: "A NEW PRINTER ARRIVES"
TEXT 2: "FEATURING A NEW FUNCTION CAPABLE OF BOTH HIGH SPEED PRINTING AND HIGH IMAGE QUALITY"

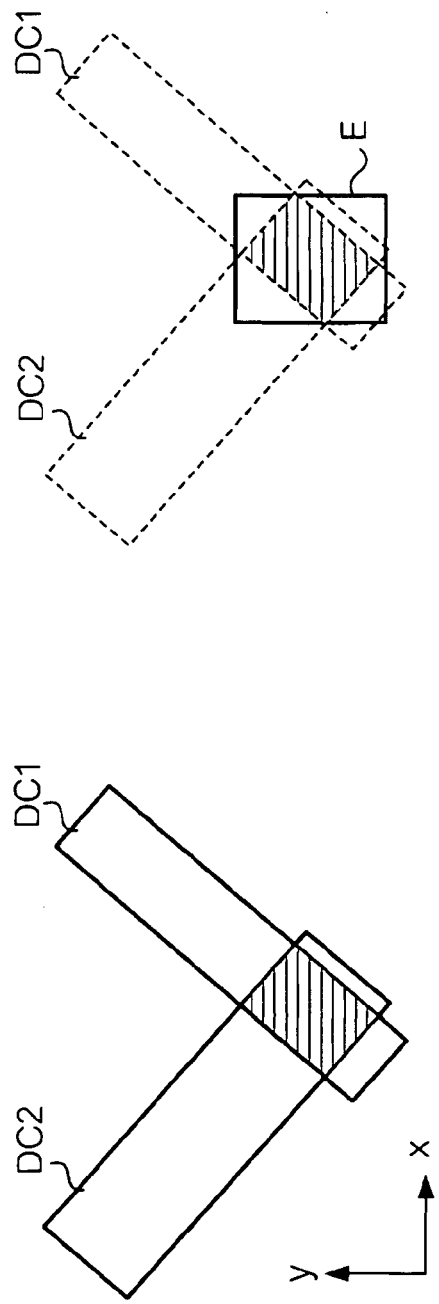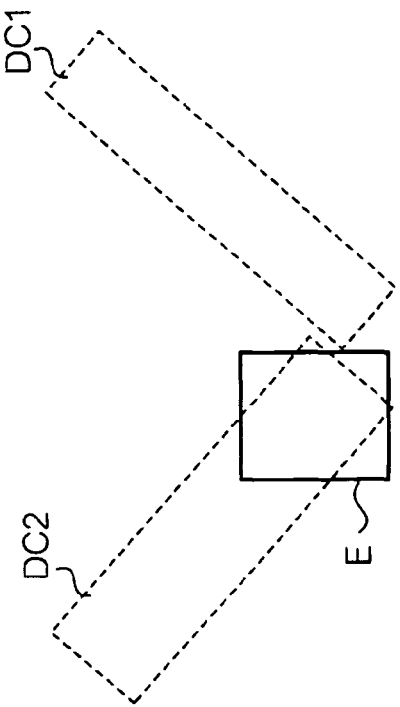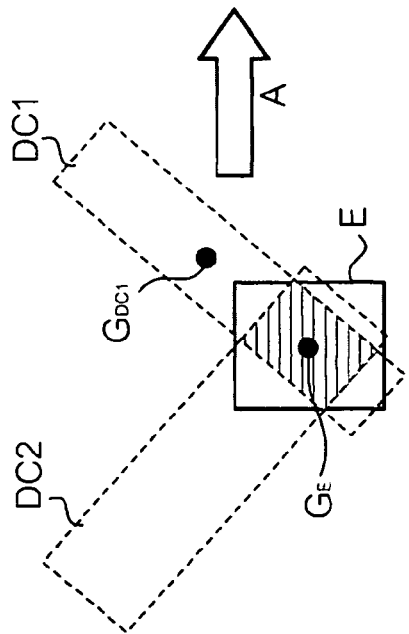

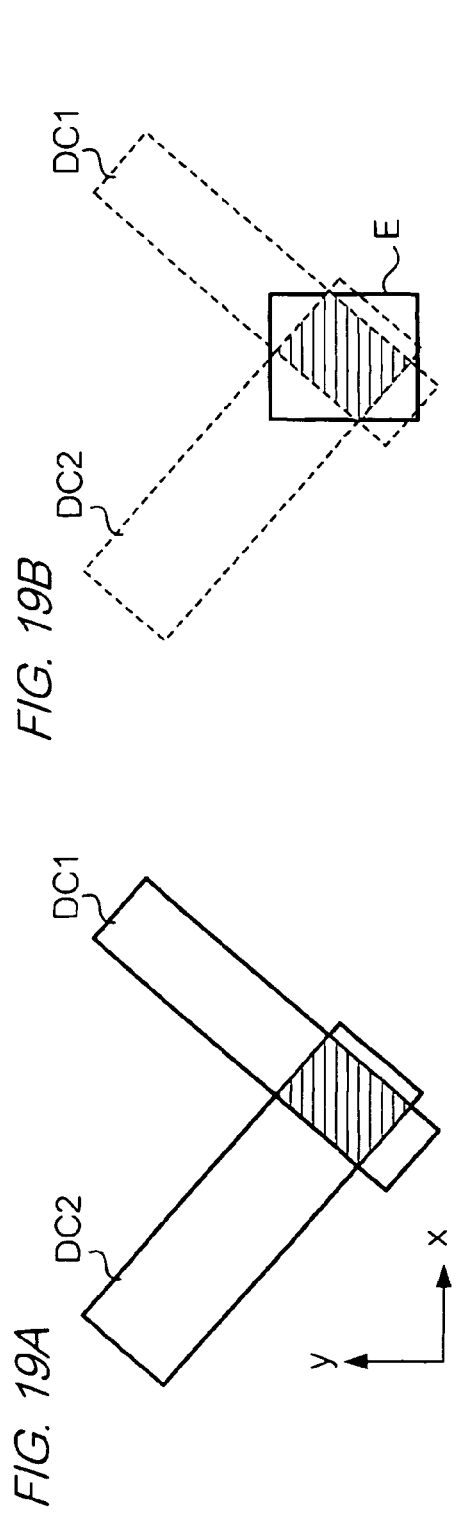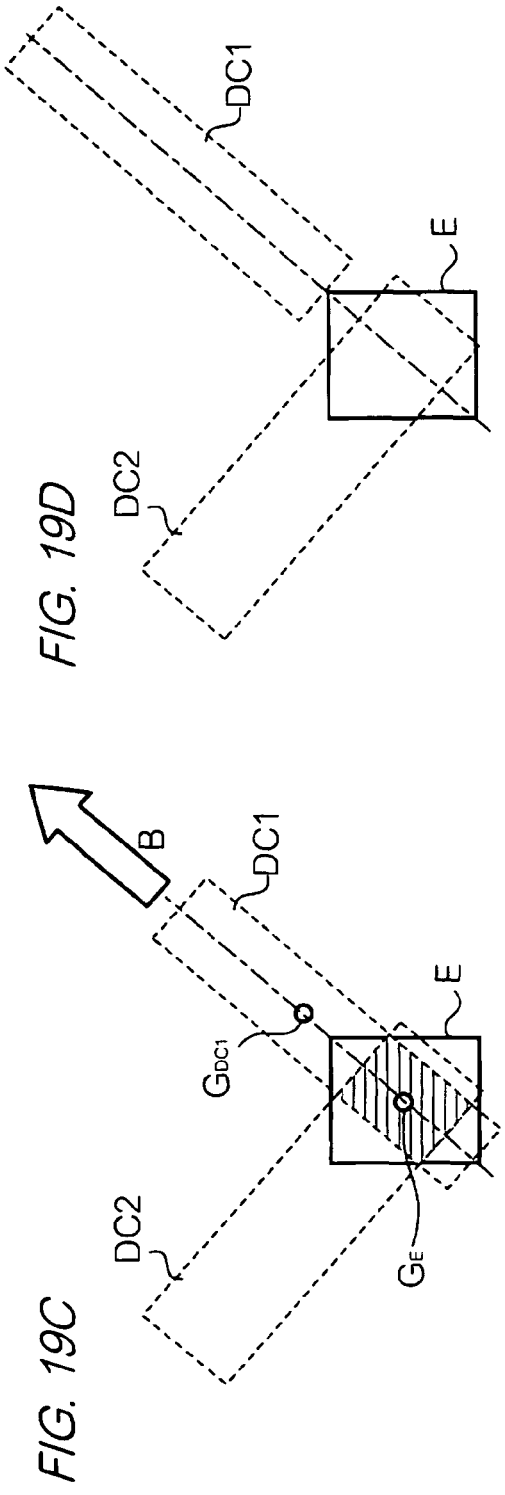

DIGITAL CONTENT CREATION SYSTEM, DIGITAL CONTENT CREATION METHOD, AND PROGRAM PRODUCT

The entire disclosure of Japanese Patent Application No. 2005-328901, filed on Nov. 14, 2005 is expressly incorporated by reference herein.

BACKGROUND

1. Technical Field

The present invention relates to technology for generating digital content output. In particular, the invention relates to technology for removing overlap of digital content generally set out on a layout to create digital content having good visibility.

2. Related Art

There are digital content distribution systems which provide users with digital content such as news, etc. Digital content distribution systems commonly employ content registration databases ("database" will be hereinafter referred to as DB) which stores content. In one known kind of digital content distribution system, one or a plurality of sets of digital content provided by a content registration DB is read, edited, and provided to users. When editing digital content, the content is laid out in such a way as to be easily viewed by a user. Such a layout can be achieved, for example, by providing plural information frames within a layout region, and including in such frames digital content (information) such as text or images.

However, in using such frames, if plural digital content sets are laid out such that they overlap, the result is unattractive to a user and may be difficult to view. Therefore when editing, it is necessary to avoid such overlap. For example, JP-A-2004-046858 discloses a technique for removing overlap of digital content. In this related art, if two sets of digital content overlap, a technique is employed whereby one set of digital content is moved in a predetermined direction by a minimum distance necessary to resolve the overlap.

However, the technique disclosed in the related art mentioned above suffers from a problem in that overlap of digital content cannot be resolved in a case that it is not possible to move overlapping content in a predetermined direction, as is the case when another set of digital content already exists in the path of the predetermined direction of the data to be moved.

SUMMARY

The invention provides a technique for flexibly and effectively removing overlap between digital content sets.

According to one aspect of the invention, there is provided a digital content creation system, including: a content database that stores a plurality of digital content sets; a select section that selects from among the stored plurality of digital content sets at least one target digital content sets for processing; a layout determination section that determines, based on a predetermined template or a selected template in accordance with a template select instruction, a layout for more than one target selected digital content sets; a property information generation section that generates property information for the more than one target selected digital content sets, based on the layout determined by the layout determination section, the property information including overlap information indicative of an overlap state of the more than one target selected digital content sets, and including importance information indicative of a relative importance of each of the more than one target selected digital content sets; an overlap detect section that detects, based on the overlap information included in the property information generated by the property information generation section, an overlapping region where overlap exists between the more than one target selected digital content sets; a move-target digital content determination section that determines, based on the importance information included in the property information generated by the property information generation section, at least one of the more than one target selected digital content sets as a move-target digital content set to be moved; a move direction determination section that determines a move direction for the move-target digital content set to be moved; a move distance calculation section that calculates a move-distance for the move-target digital content set to be moved in the move direction determined by the move direction determination section, so as to remove overlap between the more than one target selected digital content sets; and a content move section that moves the move-target digital content set in the move direction determined by the move direction determination section by the move distance calculated by the move-distance calculation section.

According to another aspect of the invention, there is provided a digital content creation system, including: a content database that stores a plurality of digital content sets; a select section that selects from among the stored plurality of digital content sets more than one target digital content sets for processing; a layout determination section that determines, based on a predetermined template or a selected template in accordance with a template select instruction input by the user, a layout for the more than one target selected digital content sets; a storage section that stores property information for the more than one target selected digital content sets, the property information including overlap information indicative of an overlap state of the more than one target selected digital content sets, and including importance information indicative of a relative importance of each of the more than one target selected digital content sets; an overlap detect section that detects, based on the overlap information included in the property information stored in the storage section, an overlapping region where overlap exists between the more than one target selected digital content sets; a move-target digital content determination section that determines, based on the importance information included in the property information stored in the storage section, at least one of the more than one target selected digital content sets as a move-target digital content set to be moved; a move direction determination section that determines a move direction for the move-target digital content set to be moved; a move distance calculation section that calculates a move-distance for the move-target digital content set to be moved in the move direction determined by the move direction determination section, so as to remove overlap between the more than one target selected digital content sets; and a content move section that moves the move-target digital content set in the move direction determined by the move direction determination section by the move distance calculated by the move-distance calculation section.

The content creation systems described above may be preferably configured such that the move direction determination section determines as the move direction of the move-target digital content set a direction of a minor edge of a quadrangle circumscribed on the overlapping region, the direction of a minor edge allowing a centroid of the move-target digital content set and a centroid of the overlapping region to move away from each other.

Alternatively, the content systems described above may be preferably configured such that the move direction determination section determines, as the move direction of the move-target digital content set, a direction parallel to a line connecting a centroid of the overlapping region and a centroid of the move-target digital content set, the parallel direction allowing the centroid of the move-target digital content set and the centroid of the overlapping region to move away from each other.

Also alternatively, the content systems described above may be preferably configured such that the move distance calculation section calculates two move distances, one of the two move distances being required for the move-target digital content set to move out of the overlapping region, and the other of the two move distances being required for the move-target digital content set to remove overlap between the move-target digital content set and the other digital content sets of the more than one target selected digital content sets.

Also alternatively, the content systems described above may be configured such that the property information further includes blank information indicative of a blank in the layout, and the move distance calculation section calculates the move distance so as to move the move-target digital content set to the blank indicated by the blank information.

Also alternatively, the content systems described above may be configured to further include: a determination section that determines whether the overlap between the more than one target selected digital content sets can be removed or not by moving the move-target digital content set in the direction determined by the move direction determination section; and a move direction change section that changes the move direction if the determination section determines that the overlap cannot be removed.

Also alternatively, the above content systems each may be configured to further include: a determination section that determines whether the overlap between the more than one target selected digital content sets can be removed or not by moving the move-target digital content set in the direction determined by the move distance determination section; and a reduction section that reduces a size of the move-target digital content set if the determination section determines that the overlap cannot be removed.

The content systems each may further be configured such that the determination section further determines whether the overlap between the more than one target selected digital content sets can be removed or not by the reduction section; and the system further comprises a rotation section that rotates the move-target digital content set if the determination section determines that the overlap cannot be removed.

Alternatively, the content creation systems each may be configured to further include: a determination section that determines whether the overlap between the more than one target selected digital content sets can be removed or not by moving the move-target digital content set in the direction determined by the move distance determination section; and a move-target digital content change section that determines as a new move-target digital content set at least another target digital content set other than target digital content sets having importance information indicative of a lowermost importance.

According to still another aspect of the invention, there is provided a digital content creation method, including: selecting from among a plurality of digital content sets stored in a content database at least one target digital content sets for processing; determining, based on a predetermined template or selected in accordance with a template select instruction input by the user, a layout for the more than one target selected digital content sets; generating property information for the more than one target selected digital content sets, based on the layout, the property information including overlap information indicative of an overlap state of the more than one target selected digital content sets, and including importance information indicative of a relative importance of each of the more than one target selected digital content sets; detecting, based on the overlap information included in the property information, an overlapping region where overlap exists between the more than one target selected digital content sets; determining, based on the importance information included in the property information, at least one of the more than one target selected digital content sets as a move-target digital content set to be moved; determining a move direction for the move-target digital content set to be moved; calculating a move-distance for the move-target digital content set to be moved in the move direction, so as to remove overlap between the more than one target selected digital content sets; and moving the move-target digital content set in the move direction by the move distance.

According to yet another aspect of the invention, there is provided a program product which causes a computer to execute the digital content creation method described above.

According to still another aspect of the invention, there is provided a digital content creation method, including: selecting from among a plurality of digital content sets stored in a content database at least one target digital content sets for processing; determining, based on a predetermined template or selected in accordance with a template select instruction input by the user, a layout for the more than one target selected digital content sets; detecting, based on the overlap information included in property information, an overlapping region where overlap exists between the more than one target selected digital content sets, the property information being stored in a storage section and including overlap information indicative of an overlap state of the more than one target selected digital content sets, and including importance information indicative of a relative importance of each of the more than one target selected digital content sets; determining, based on the importance information included in the property information, one of the more than one target selected digital content sets as a move-target digital content set to be moved, the importance information for the determined one indicating a lowermost importance; determining a move direction for the move-target digital content set to be moved; calculating a move-distance for the move-target digital content set to be moved in the move direction, so as to remove overlap between the more than one target selected digital content sets; and moving the move-target digital content set in the move direction by the move distance.

According to yet another aspect of the invention, there is provided a program product which causes a computer to execute the digital content creation method described above.

BRIEF DESCRIPTION OF THE DRAWINGS

The invention will be described with reference to the accompanying drawings, wherein like numbers reference like elements:

FIG. 18 specifically depict the overlap remove processing;

FIG. 19 also specifically depict the overlap remove processing;

DESCRIPTION OF EXEMPLARY EMBODIMENTS

Embodiments of the invention will now be described below with reference to the accompanying drawings.

1. First Embodiment 1-1. System Configuration

Figure 1:
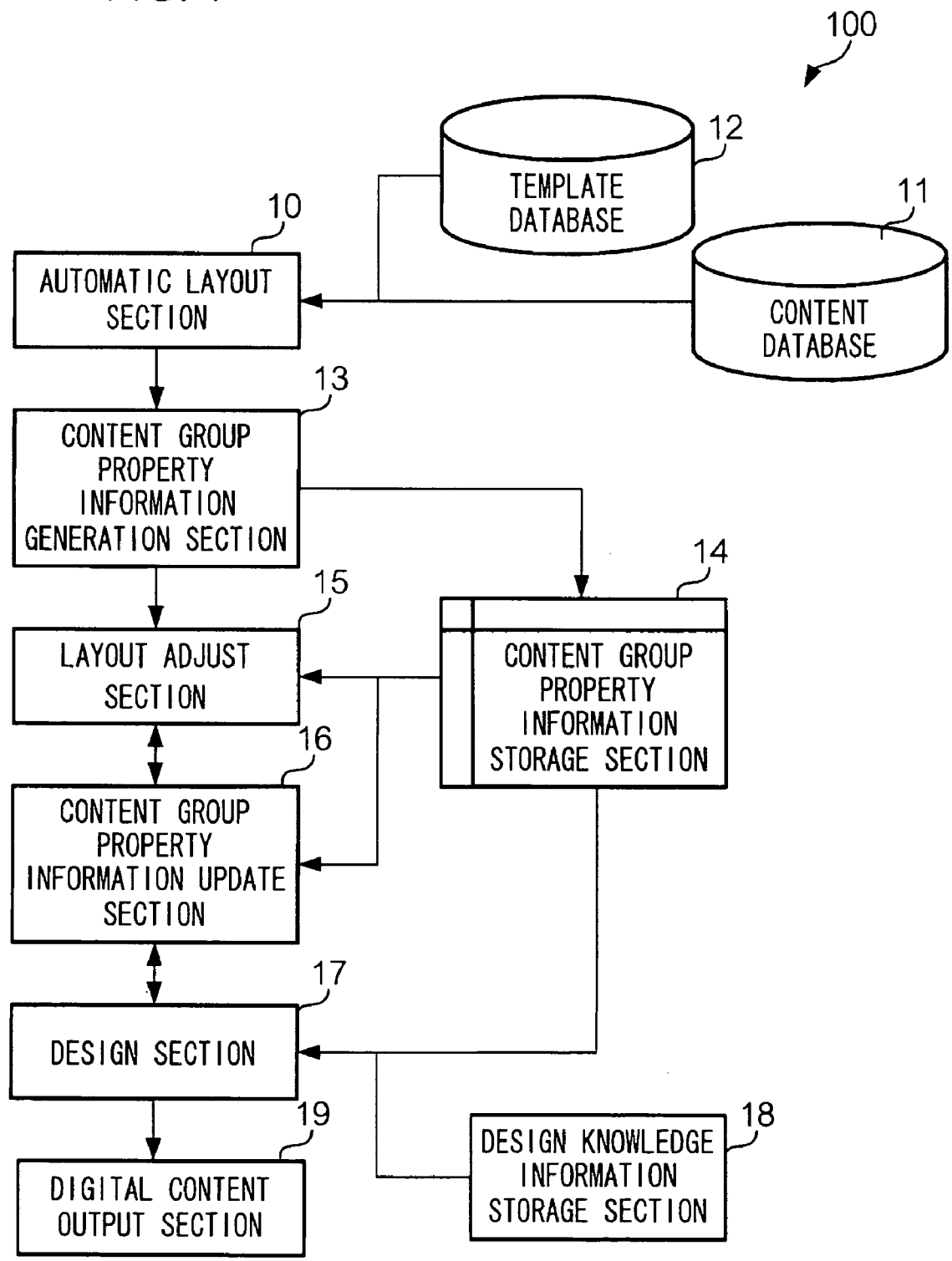
FIG. 1 is a block diagram showing a configuration of a digital content creation device 100.

FIG. 1 is a block diagram and shows a configuration of a digital content creation device 100 according to the first embodiment of the invention. A content database 11 is a database which records plural digital content sets. The digital content sets include, for example, various kinds of text data and also various kinds of image data. Text data are titles, bodies, catch-phrases, etc. Image data are background images, human images, animal images, product images, etc.

A template database 12 records plural layout templates which are respectively related to digital content sets for various use purposes such as for catalogues, posters, etc. Layout information includes category information, location information, importance information, text information, image information, and the like. The category information is indicative of a category of a digital content set. The category information indicates, for example, a title, body, main image, subsidiary image, or the like. The location information is indicative of a located position of a related digital content set. The importance information is indicative of an importance of a digital content set. The text information is indicative of a display style of text including a font size, a font type, color, character spacing, line pitch, and/or the like if a digital content set is related to a text. The image information is indicative of image properties such as a number of images, image quality, a size, an aspect ratio, and/or the like. The layout information is described, for example, in XML (Extensible Markup Language).

An automatic layout section 10 obtains a layout template from the template database 12 in response to an instruction from a user via an input device 74 described later. The automatic layout section 10 obtains digital content sets from the content database 11, according to an instruction input by the user. Based on the obtained layout template, the automatic layout section 10 further automatically sets out the obtained digital content sets as an initial layout. Alternatively, the initial layout may be decided according to an instruction inputted by a user.

A content group property information generation section 13 generates content group property information. The content group property information is indicative of properties of digital content sets laid out (located) in a certain region. In the description below, a "setting region" refers to a target region to be subjected to digital content creation processing, i.e., a region plural digital content sets are located. Also in the description below, "region information" refers to information which specifies a figure indicative of a contour of a certain region in a setting region. The region information includes, for example, relative coordinates of a polygon, minor and major axes of an ellipse, or the like. In the first embodiment, a layout template includes information which defines a region where digital content sets are located, such as a single page, plural pages, a single section, or plural sections. The content group property information generation section 13 generates location information, overlap information, blank information, color distribution information, and/or importance distribution information, concerning digital content sets in the setting region.

A content group property information storage section 14 stores content group property information generated by the content group property information generation section 13, and content group property information updated by a content group property information update section 16. The content group property information storage section 14 is constituted by a storage device 70 described later.

A layout adjust section 15 adjusts a layout of digital content sets laid out in the initial layout. In the first embodiment, the layout adjust section 15 removes overlap of digital content sets and adjusts grids, image sizes, font sizes, font types, and colors.

A content group property information update section 16 regenerates content group property information, based on information of digital content sets adjusted by the layout adjust section 15. Aforementioned information of the digital content sets includes, for example, location information of each digital content set after moving content sets, size information of each digital content set after changing sizes, and/or color information of each digital content set after color conversion. The content group property information update section 16 further updates content group property information stored in the content group property information storage section 14 with the regenerated content group property information. The content group property information update section 16 also updates content group property information, based on information of digital content sets designed by a design section 17 described later. In this case, the information of digital content sets includes, for example, size information of each digital content set after changing sizes, and color information of each digital content set after color conversion.

A design knowledge information storage section 18 stores design knowledge information which reflects designers' knowledge about layout design of catalogues and posters, as rules and information. The design knowledge information storage section 18 is constituted by the storage device 70.

The design section 17 has a function of designing digital content sets a layout of which has been adjusted based on the design knowledge information stored in the design knowledge information storage section 18 (such content sets will be referred to as "digital content output" hereinafter). That is, the design section 17 performs processing for raising design quality of digital content output, based on designers' design knowledge.

An output digital content output section 19 outputs to an output device 72 described later the digital content output which have been designed by the design section 17. For example, if the output device 72 is a display device, the digital content output are displayed. Alternatively, if the output device 72 is a printing device, the digital content output are printed.

Figure 2:
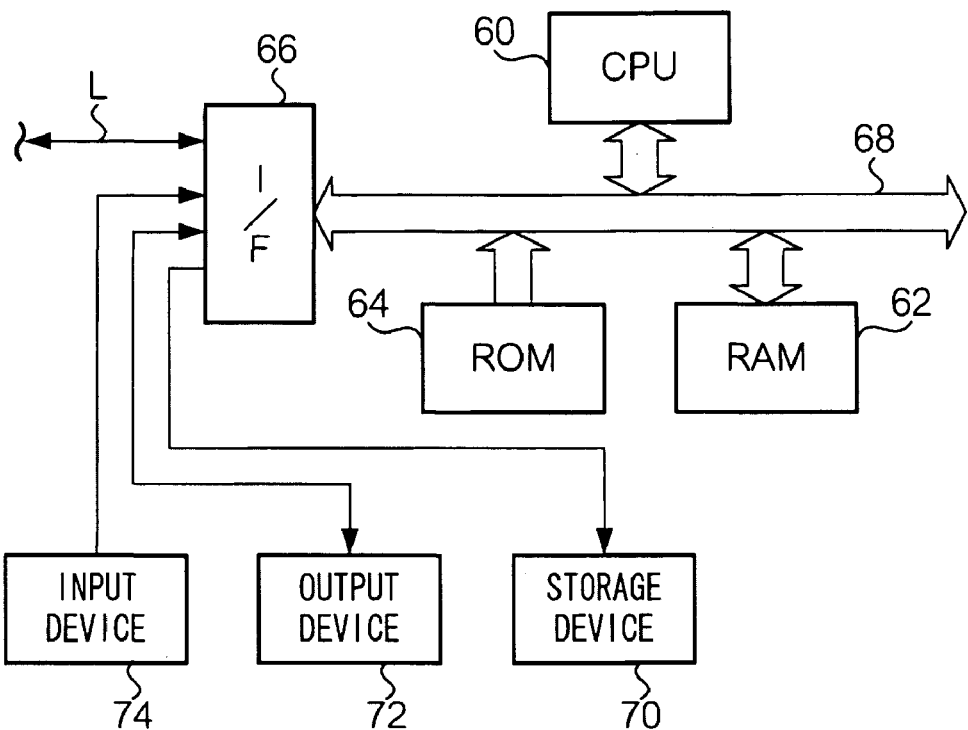
FIG. 2 shows a hardware configuration of the digital content creation device 100.

FIG. 2 shows a hardware configuration of the digital content creation device 100. A CPU (Central Processing Unit) 60 performs various controls and calculation processing. A RAM (Random Access Memory) 62 is a main storage device. A ROM (Read Only Memory) 64 is a storage device dedicated only to reading. An internal/external bus 68 serves to transmit/receive data and signals. The storage device 70 is an external storage device for storing various data and programs. The storage device 70 is constituted, for example, by a HDD (Hard Disk Drive). The output device 72 outputs data. The output device 72 is, for example, a printing device, CRT (Cathode Ray Tube), or LCD (Liquid Crystal Display). The input device 74 is used to input data and instructions from users. The input device 74 is constituted by, for example, an operation panel, mouse, keyboard, and/or scanner. The CPU 60 transmits/receives data and signals to/from the devices mentioned above via the internal/external bus 68 and I/F (Interface) 66. The digital content creation device 100 is capable of communicating with a print instruction device (not shown in the figures) via the I/F 66 and a network L.

As the user turns on the power, the CPU 60 reads and executes a system program such as BIOS (Basic Input/Output System). Thus executing the BIOS, the CPU 60 reads and executes a computer program installed in the storage device 70. This computer program is installed via a recording medium such as a CD-ROM, DVD-ROM, or flexible disk (FD), or via a communication network such as the internet. The CPU 60 executes the computer program to perform predetermined controls and calculation processing using various resources. In this manner, functions shown in FIG. 1 are achieved.

1-2. Operation Outline

Next described will be an output digital content creation processing according to this embodiment.

Figure 3:
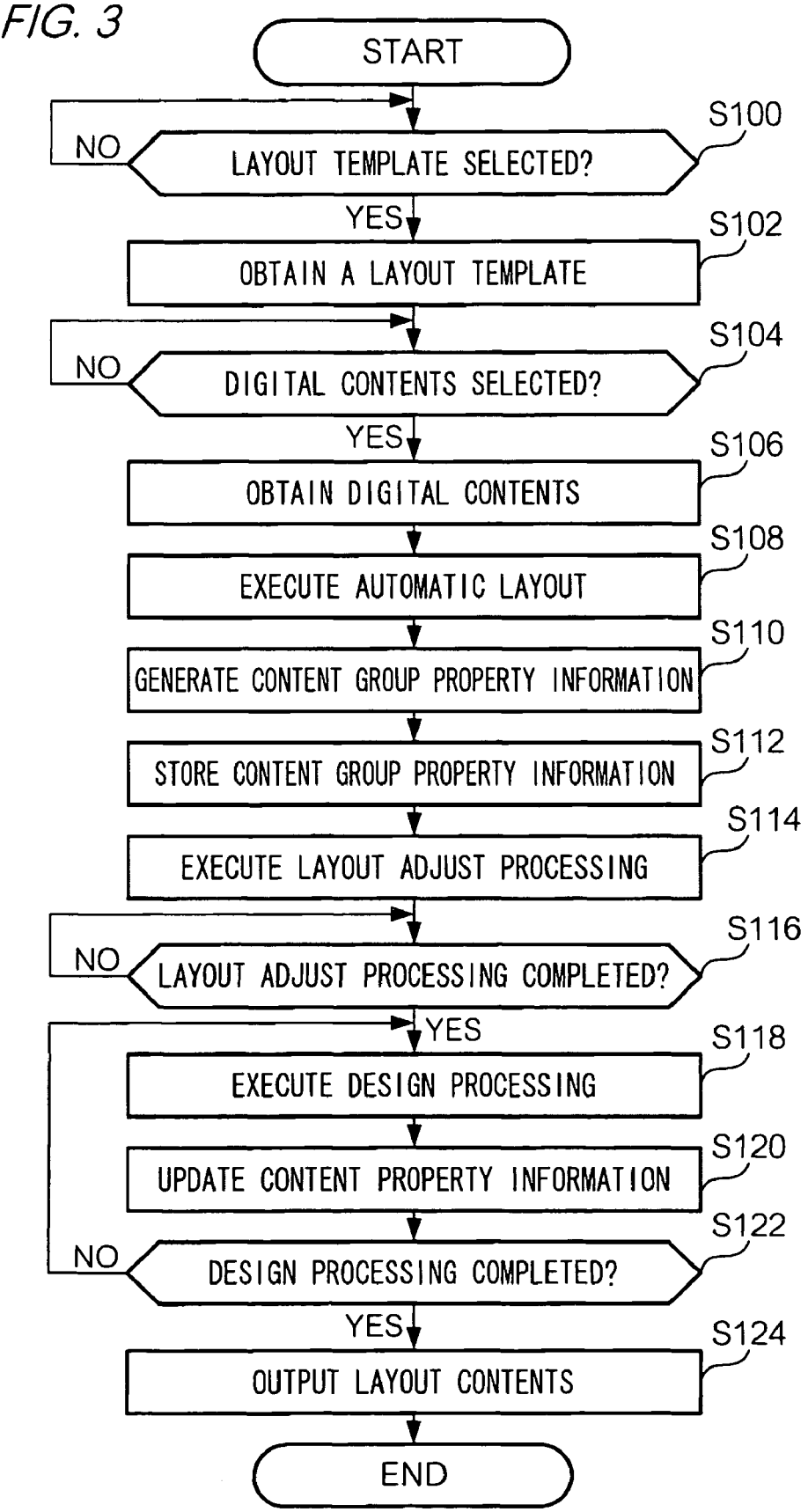
FIG. 3 is a flowchart showing an example of an output digital content creation processing.

FIG. 3 is a flowchart of an example of the output digital content creation processing. In a step S100, the CPU 60 determines whether a user has selected a layout template or not, based on a selection instruction obtained via the input device 74. If a layout template is determined to have been selected (S100: YES), the CPU 60 advances the processing to a step S102. Otherwise, if no layout template is determined to have been selected (S100: NO), the CPU 60 repeats this determination processing until a layout template is selected. Next, in a step S102, the CPU 60 obtains the layout template selected in the step S100 from the template database 12. The CPU 60 stores the obtained layout template into the RAM 62.

Figure 4:
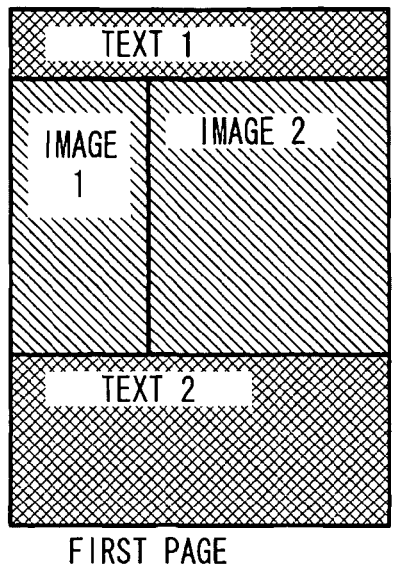
FIG. 4 shows an example of a layout template.

FIG. 4 shows an example of a layout template. Description will be made below of the example of a layout template. In FIG. 4, the layout template defines locations of four digital content sets, i.e., a text 1, image 1, image 2, and text 2. In this template, "category=title", "priority=High", "align=Top:Left", and "fontsize=96 pt" are set in advance as layout information for the text 1. As layout information for the image 1, "category=sub-image", "priority=Low", and "align=Top:Left" are set. Likewise, "category=main-image", "priority=High", and "align=Top:Left" are set as layout information for the image 2. As layout information for the text 2, "category=body", "priority=Middle", "align =Top:Left", and "fontsize=16 pt" are set. In the description below, "priority" refers to an index given in advance to a layout region or layout element (digital content set) and is indicative of priority given to such a layout region or element. Further, "importance" refers to an index which indicates relative importance of each layout element in a layout region, based on priority given to a layout element. An importance is calculated based on priority given in advance. Alternatively, an importance level can be calculated based on location of a layout element if the digital content set is not given priority in advance.

Referring to FIG. 3 again, in a step S104, the CPU 60 determines whether the user has selected digital content sets or not, based on a selection instruction inputted via the input device 74. If it is determined that digital content sets have been selected (S104: YES), the CPU 60 advances the processing to a step S106. Otherwise, if it is determined that digital content sets have not been selected (S104: NO), the CPU 60 repeats the determination processing until a number of digital content sets equal to a number defined in the selected layout template are selected. Next, the CPU 60 obtains in the step S106 the selected digital content sets from the content database 11. The CPU 60 stores the obtained digital content sets into the RAM 62.

Figure 5:
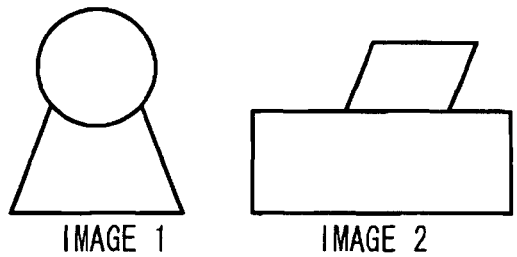
FIG. 5 shows examples of digital content sets.

FIG. 5 shows examples of the selected digital contents. The examples in FIG. 5 are a character string "a new printer arrives" obtained as the text 1, a human image as the image 1, an image of the printer as the image 2, as well as a character string "featuring a new function capable of both high speed printing and high image quality" as the text 2.

Referring again to FIG. 3, in a step S108, the CPU 60 sets out the obtained digital content sets into an initial layout in accordance with the obtained layout template.

Figure 6:
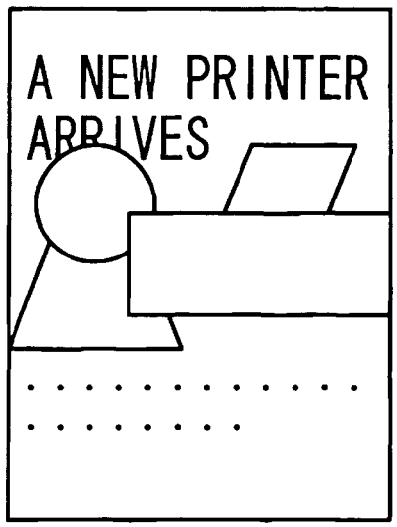
FIG. 6 shows an example of a result obtained by an initial layout.

FIG. 6 shows an example of a result obtained by the initial layout. A set of plural digital content sets located in accordance with the layout template are called "digital content output". Among the digital content sets after the initial layout, the title of the text 1 and the human image of the image 1 partially overlap each other, and the human image of the image 1 and the image of the printer as the image 2 partially overlap each other.

Referring again to FIG. 3, in a step S110, the CPU 60 generates content group property information, based on the digital content sets laid out in the initial layout and layout information. Details of the content group property information generation processing will be described later. Next in a step S112, the CPU 60 stores generated content group property information into the RAM 62. Next in a step S114, the CPU 60 performs a layout adjust processing on the digital content output, based on the stored content group property information. Details of the layout adjust processing will be described later.

Next in a step S116, the CPU 60 determines whether the layout adjust processing is complete or not. If the layout adjust processing is determined to be complete (S116: YES), the CPU 60 advances the processing to a step S118. Otherwise, if the layout adjust processing is determined to be incomplete (S116: NO), the CPU 60 repeatedly executes this determination processing.

The CPU 60 obtains in the step S118 design knowledge information from the design knowledge information storage section 18. Further, the CPU 60 executes a design processing on the digital content output a layout of which has been adjusted, based on the obtained design knowledge information and content group property information stored in the RAM 62.

Next in a step S120, the CPU 60 generates content group property information, based on the information of the digital content output subjected to the design processing. The CPU 60 further updates content group information stored in the RAM 62, based on the generated content group property information. Next in a step S122, the CPU 60 determines whether the design processing is complete or not. If the design processing is determined to be complete (S122: YES), the CPU 60 advances the processing to a step S124. Otherwise, if the design processing is determined to be incomplete (S122: NO), the CPU 60 repeatedly executes the processing from the step S118 to S120.

In the step S124, the CPU 60 outputs to the output device 72 the digital content output design processing of which is complete. The CPU 60 then terminates the output digital content generation processing. It is to be noted that the CPU 60 can output the digital content output via the network L to any other device connected to the network L.

1-3. Content Group Property Information Generation Processing

Figure 7:
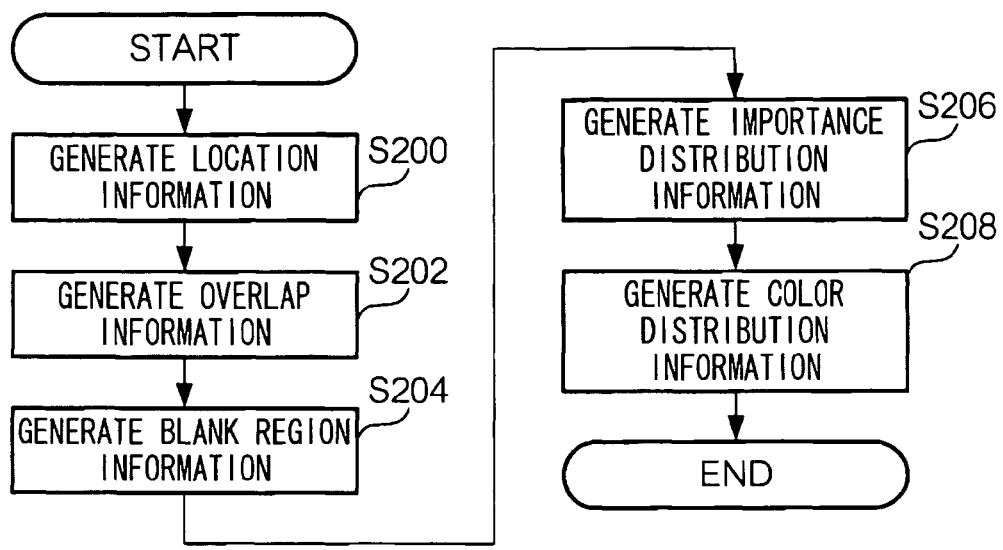
FIG. 7 is a flowchart showing details of a content group property information generation processing.

FIG. 7 is a flowchart showing details of the content group property information generation processing. In a step S200, the CPU 60 executes location information generation processing to generate location information. The location information indicates located positions of respective digital content sets in a layout template. In this embodiment, location information includes shape information and coordinate information of each digital content set. Details of the location information generation processing will be described later.

Next, in a step S202, the CPU 60 executes an overlap information generation processing to generate overlap information. The overlap information used herein is indicative of an overlap state of each of digital content sets laid out in a setting region. In this embodiment, the overlap information includes a number of overlapping digital content sets, information concerning an overlapping region (information of an overlapping amount). Details of the overlap information generation processing will be described later.

Next, in a step S204, the CPU 60 executes a blank region information generation processing to generate blank region information. The blank region information concerns blank parts in a setting region other than regions occupied by digital content sets laid out in the setting region. In this embodiment, the blank region information includes one or both of two types of region information (coordinate information). One type is obtained in case of approximating a blank space to a rectangular region having a predetermined size, and the other type is obtained in case of approximating a blank space to an elliptic region having a predetermined size. Details of the blank region information generation processing will be described later.

Next, in the step S206, the CPU 60 executes an importance distribution information generation processing to generate importance distribution information. The importance distribution information indicates a distribution state of importance of each of digital content sets laid out in a setting region. In this embodiment, the importance distribution information includes information concerning priority of each digital content set, which is set in a layout template, and region information of each digital content set. Details of the importance distribution information generation processing will be described later.

Next, in a step S208, the CPU 60 executes a color distribution information generation processing to generate color information. The color distribution information indicates a distribution state of color in a setting region. In this embodiment, the color information includes information of a representative color of each of digital content sets laid out in a setting region, and region information of each digital content set. Details of the color distribution information generation processing will be described later. The CPU 60 stores the aforementioned various information as content group property information into storage device 70. Upon completion of the processing in the step S208, the CPU 60 terminates the content group property information generation processing.

Details of individual processing in the content group property information generation processing will be now described below.

Figure 8:
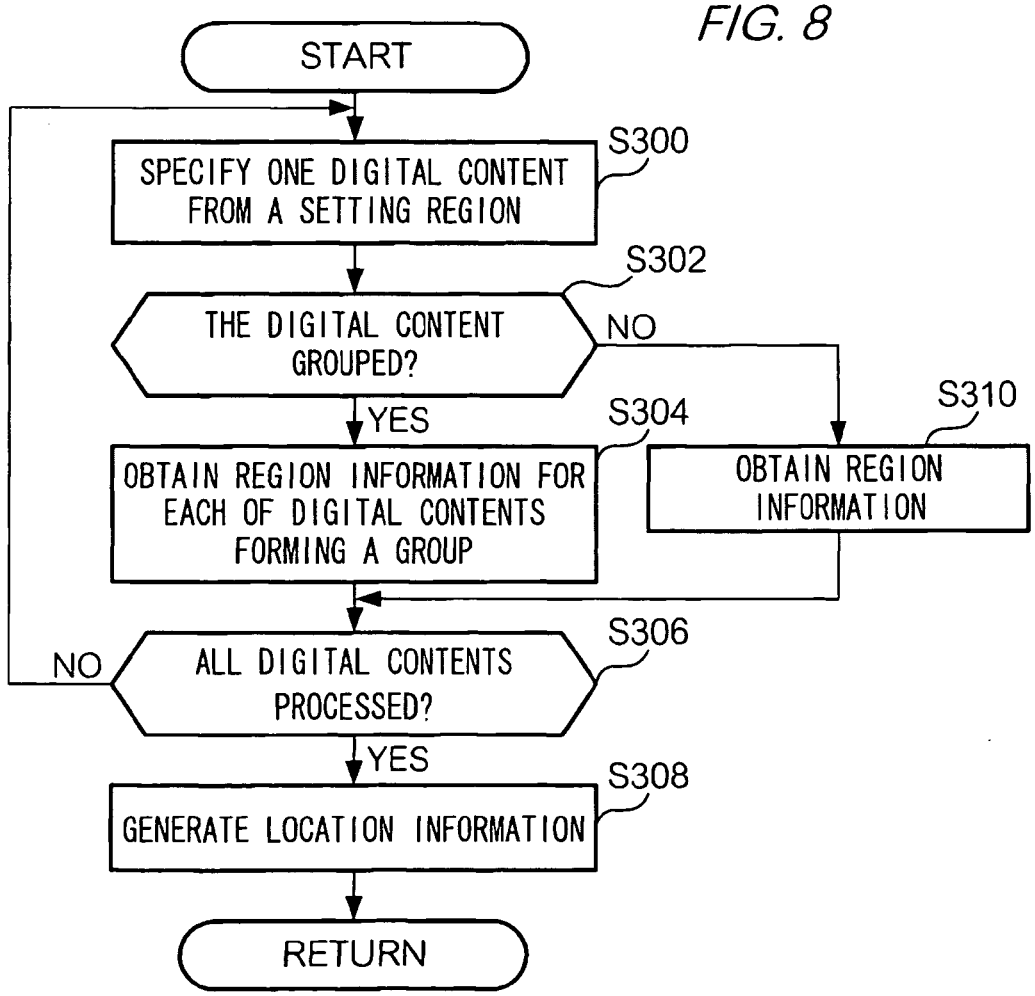
FIG. 8 is a flowchart showing details of a location information generation processing.

FIG. 8 is a flowchart showing details of the location information generation processing. In a step S300, the CPU 60 specifies one digital content set among digital content sets laid out in a setting region, for example, using a parameter given by a counter. Next in a step S302, the CPU 60 determines whether the specified digital content set is grouped or not. A grouped digital content set is associated with a flag indicative of being grouped and to information specifying a group concerned. The CPU 60 makes a determination about grouping. If a digital content set is determined to be grouped (S302: YES), the CPU 60 advances the processing to a step S304. Otherwise, if the digital content set is not determined to be grouped (S302: NO), the CPU 60 advances the processing to a step S310.

In the step S304, the CPU 60 obtains region information for each of digital content sets constituting a group concerned. This process will now be described exemplifying the digital content output shown in FIG. 6.

Figure 9A:
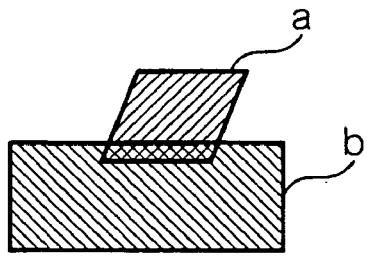
FIG. 9 shows examples of grouping of digital content sets.
Figure 9B:
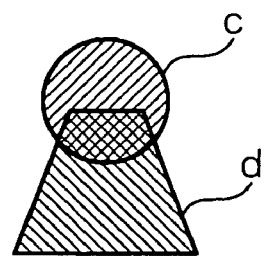

FIG. 9 shows examples of grouping of digital content sets. Of the digital content output in FIG. 6, the human image is formed by grouping two digital content sets c and d. In this embodiment, region information is obtained individually for each of digital content sets c and d forming one human image. Similarly, region information is also obtained individually for digital contents a and b forming the image of a printer. With respect a text, region information is obtained for each line in a layout region. Where the title "a new printer arrives" in the example in FIG. 6 is referred to, this title is recognized as grouped two digital content sets of "a new printer" and "arrives". The CPU 60 obtains region information individually for each of these two digital content sets. Upon obtaining the region information, the CPU 60 advances the processing to a step S306.

Referring back to FIG. 8, the CPU 60 obtains in a step S310 region information of a specified digital content set. Obtaining of the region information is carried out in the same manner as in the step S304. Upon obtaining of the region information, the CPU 60 advances the processing to the step S306.

In the step S306, the CPU 60 determines whether or not region information has been obtained for all digital content sets laid out in the setting region. If region information is determined to have been obtained for all digital content sets (S306: YES), the CPU 60 advances the processing to the step S308. Otherwise, if region information has not yet been obtained for all the digital content sets (S306: NO), the CPU 60 repeatedly executes the processing of the steps S300 to S306.

In the step S308, the CPU 60 generates location information based on the obtained region information. After generating the location information, the CPU 60 terminates the processing shown in FIG. 8. If a digital content set is image information, location information thereof includes shape information of the image (circle, rectangle, ellipse, or the like), and representative coordinate information of the image (coordinates of a center of a circle, coordinates of vertices of outer edges of a rectangle, or the like). If a digital content set is a text, location information thereof includes shape information of a text box and coordinate information.

Figure 10D:
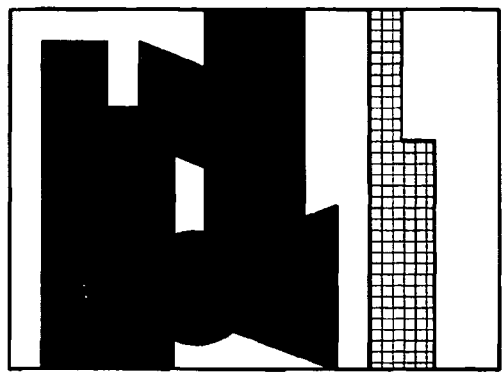
FIG. 10 visualize content group property information.
Figure 10C:
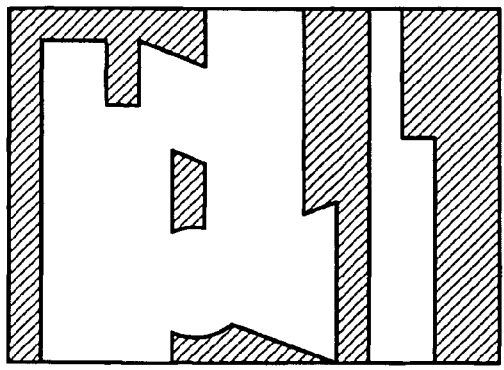
Figure 10G:
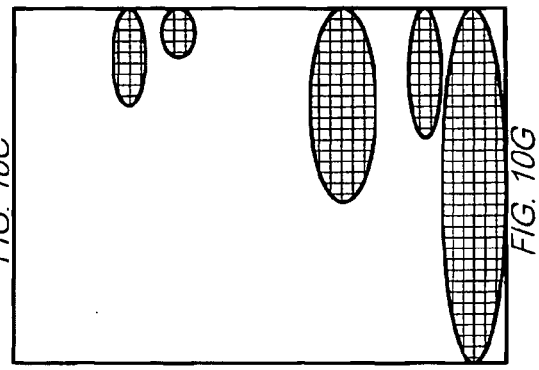
Figure 10B:
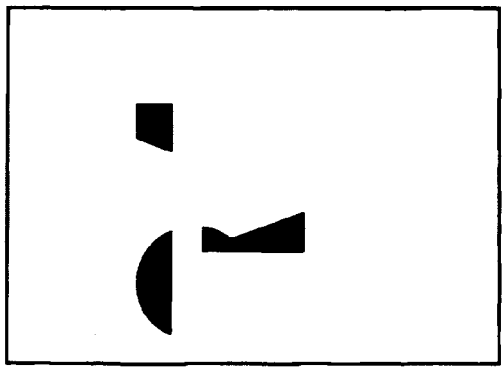
Figure 10F:
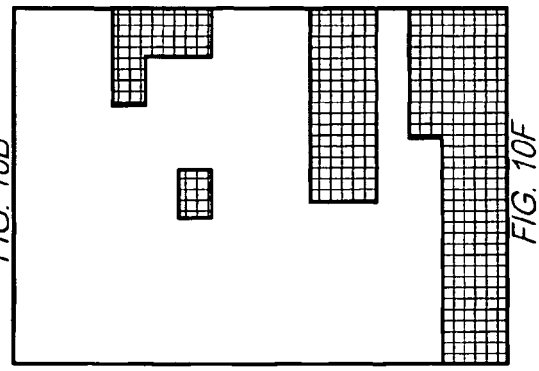
Figure 10A:
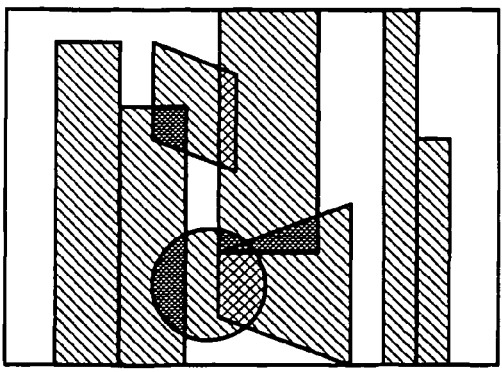

FIG. 10A visualizes location information generated with respect to the layout result shown in FIG. 6. For each region where a digital content set of text is laid out, location information indicative of a rectangular region is generated.

Figure 11:
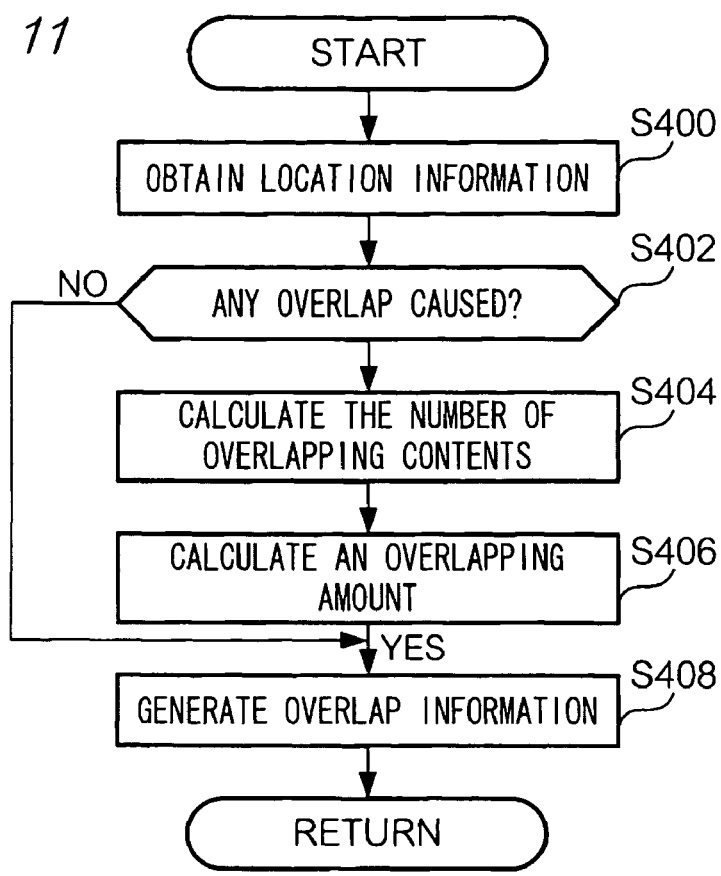
FIG. 11 is a flowchart showing details of an overlap information generation processing.

FIG. 11 is a flowchart showing details of an overlap information generation processing. In a step S400, the CPU 60 obtains location information generated in the location information generation processing. Next in the step S402, the CPU 60 determines whether the setting region includes any overlapping digital content set or not. If a digital content set is determined to be overlapping (S402:YES), the CPU 60 advances the processing to a step S404. If no digital content set is determined to be overlapping (S402: NO), the CPU 60 advances the processing to a step S408.

In the step S404, the CPU 60 calculates the number of digital content sets overlapping any other digital content set, based on location information. In the following description, a region where overlap occurs between two digital content sets is referred to as an "overlapping region". Next in a step S406, the CPU 60 calculates coordinates which specify the overlapping region, based on location information.

In the step S408, the CPU 60 generates overlap information, based on the number of overlapping items, and the coordinates of the overlapping region (corresponding to an overlapping amount). If there is no digital content set overlapping in the setting region, overlap information indicative of absence of overlap is generated. FIG. 10B visualizes overlap information generated with respect to the layout result shown in FIG. 6. After generation of the overlap information, the CPU 60 terminates the processing shown in FIG. 11.

Figure 12:
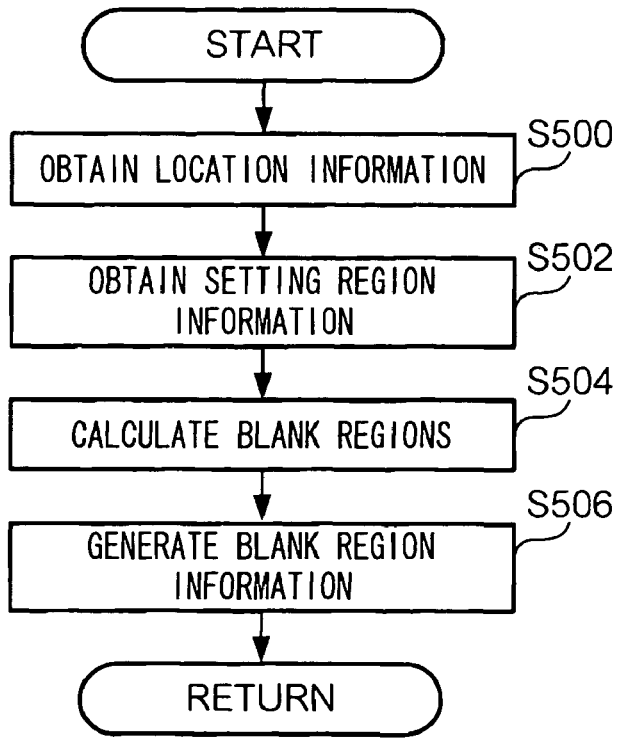
FIG. 12 is a flowchart showing details of a blank region information generation processing.

FIG. 12 is a flowchart showing details of a blank region information generation processing. In a step S500, the CPU 60 obtains the location information generated by the location information generation processing described above. Next in a step S502, the CPU 60 obtains information of a setting region. The information of a setting region specifies a region where digital content sets are located. More specifically, if a setting region is equivalent to one single page, information of the setting region is range information indicative of a region consisting of one single page. If a setting region is equivalent to plural pages, information of the setting region is range information indicative of a region consisting of plural pages (or can be range information of a region consisting of one single page if the plural pages have one identical page structure). Alternatively, if a setting region is equivalent to a single section, information of the setting region is range information indicative of a region consisting of one single section. If a setting region is equivalent to plural sections, information of the setting region is range information indicative of a region consisting of plural sections.

Next in the step S504, the CPU 60 calculates coordinates of blank regions, based on the obtained location information and the obtained range information of the setting region. A blank region refers to a region other than regions occupied by digital content sets laid out in a layout. Next in a step S506, the CPU 60 generates blank region information, based on the calculated coordinates of the blank regions. The blank region information includes one or both of two types of information. One type of information specifies a rectangular region obtained in a case of approximating a blank region to a rectangular region, and the other type of information specifies an elliptic region obtained in case of approximating the blank region to an elliptic region. The information specifying a rectangular region expresses, for example, respective vertices of a rectangle. The information specifying an elliptic region expresses, for example, coordinates of a center of an ellipse, and lengths of major and minor axes of the ellipse.

FIG. 10C visualizes all blank regions in the example shown in FIG. 6. A result of visualizing all blank regions is equal to a result of inverting location information (FIG. 10A). FIG. 10F visualizes black information obtained in case of approximating blank regions to rectangles. FIG. 10G visualizes blank information obtained in case of approximating blank regions to ellipses.

Figure 13:
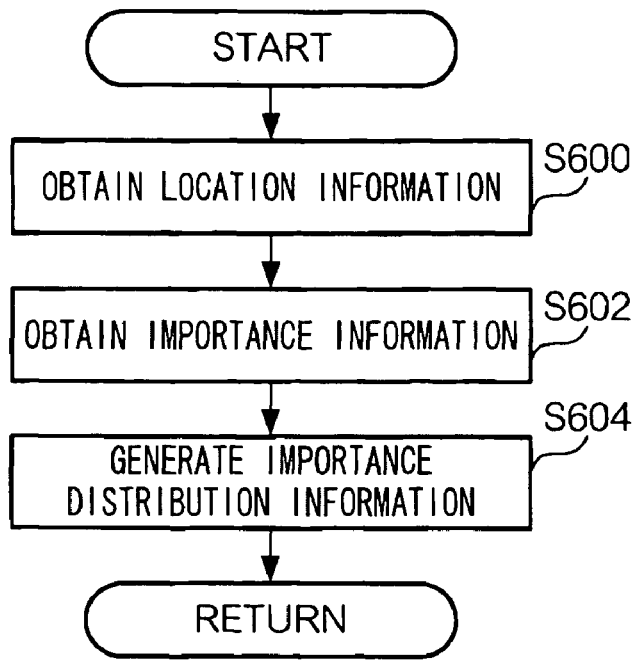
FIG. 13 is a flowchart showing details of an importance distribution information generation processing.

FIG. 13 is a flowchart showing details of an importance distribution information generation processing. In a step S600, the CPU 60 obtains layout information generated in the layout information generation processing described above. Next, in a step S602, the CPU 60 obtains importance information corresponding to a setting region in a layout template. For example, the layout template shown in FIG. 4 has information indicative of priorities of respective layout elements. The CPU 60 calculates an importance for each of digital content sets included in a layout template respectively from priorities of the digital content sets. Alternatively, the CPU 60 can calculate importances of digital content sets as digital content output by respectively multiplying priorities of digital content sets included in a layout template by priorities associated with the digital content sets.

Next, in a step S604, the CPU 60 generates importance distribution information, based on the location information and the importance information both obtained. The importance distribution information associates the importances of digital content sets with information concerning location positions of the digital content sets respectively. FIG. 10D visualizes an importance distribution in the example of FIG. 4. The higher the importance, the more densely hatched is the digital content set. The lower the importance, the more lightly hatched is the digital content set. That is, a digital content set having a priority High is most densely hatched, and a digital content set having a priority Low is most lightly hatched. A digital content set having a priority Middle is hatched at an intermediate density between High and Low. After generating the importance distribution information, the CPU 60 terminates the processing shown in FIG. 13.

Figure 10E:
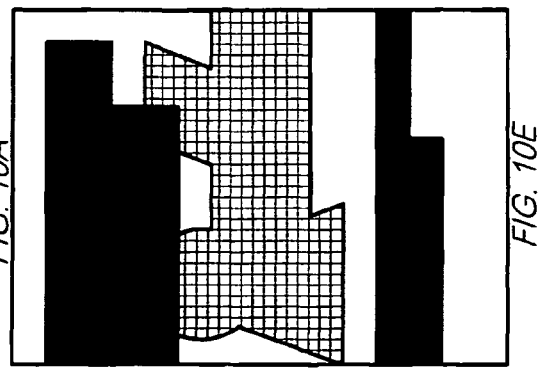
Figure 14:
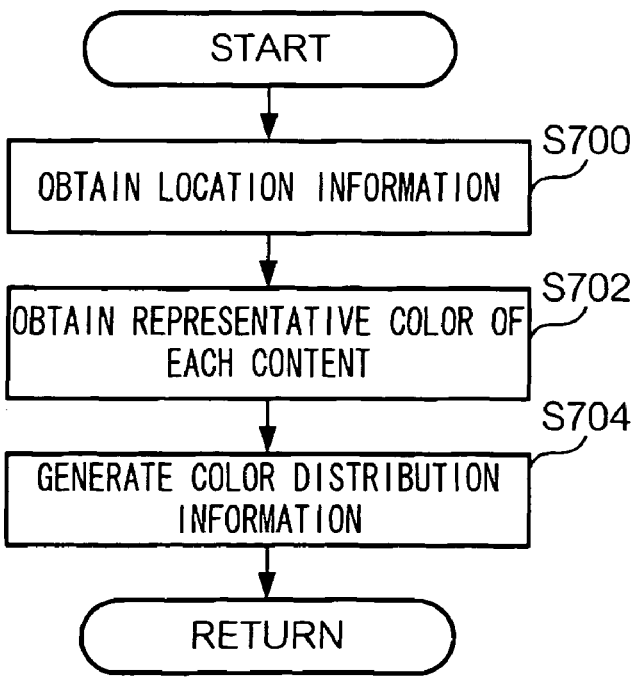
FIG. 14 is a flowchart showing details of a color distribution information generation processing.

FIG. 14 is a flowchart showing details of a color distribution information generation processing. In a step S700, the CPU 60 obtains location information generated in the location information generation processing described above. Next, in a step S702, the CPU 60 determines representative colors of the digital content sets laid out in the setting region, based on color information of the digital content sets respectively. Next, in a step S704, the CPU 60 generates color distribution information, based on the obtained location information and the determined representative colors of the respective digital content sets. In this embodiment, the color distribution information associates representative colors of digital content sets with information of location positions of the digital content sets respectively. FIG. 10E visualizes color distribution information generated in the example of FIG. 6. In FIG. 10E, regions are respectively hatched at densities corresponding to their own representative color.

Figure 15:
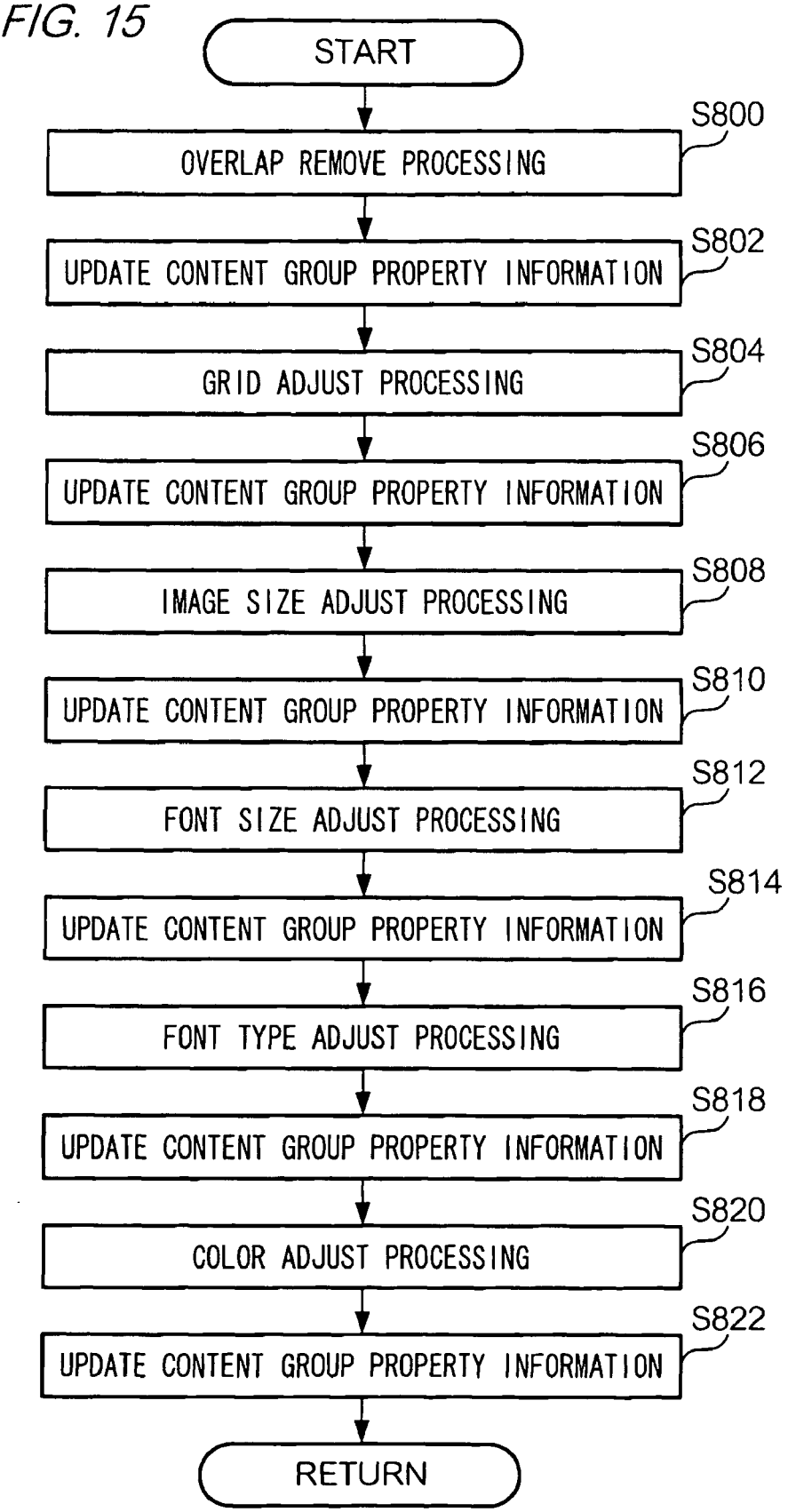
FIG. 15 is a flowchart showing details of a layout adjust processing.

FIG. 15 is a flowchart showing details of a layout adjust processing. In a step S800, the CPU 60 executes an overlap remove processing on digital content output created by an initial layout. Next in a step S802, the CPU 60 regenerates content group property information, based on information of the digital content output subjected to the overlap remove processing. The CPU 60 further overwrites (updates) content group property information before the overlap remove processing with the regenerated content group property information. The overlap remove processing refers to a processing for eliminating overlap between digital content sets in the setting region in the initial layout. The overlap remove processing is carried out based on content group distribution information such as location information, overlap information, blank region information, and/or importance distribution information. Though details will be described later, the overlap remove processing is to move (part of) an overlapping digital content set to a blank region or resizes the digital content set.

In a step S804, the CPU 60 executes a grid adjust processing on the digital content output subjected to the overlap remove processing. The grid adjust processing is to adjust positional relationships between the digital content sets so as to align, as much as possible, height positions of figures (including tables and images) of the digital content sets with grid lines provided in the setting region. By the grid adjust processing, grid positions of figures and texts are aligned. As a result, the digital content sets can attain a better appearance. At this time, if the grid positions are adjusted based on blank region information as an element of the content group distribution information, the layout can attain better-balanced blanks overall.

In a step S806, the CPU 60 regenerates content group property information, based on information of the digital content output subjected to the grid adjust processing. The CPU 60 further overwrites (updates) content group property information before the grid adjust processing with the regenerated content group property information.

In a step S808, the CPU 60 executes an image size adjust processing on the digital content output subjected to the grid adjust processing. The image size adjust processing is to equalize sizes of plural images among images which belong to one category if a difference in size between the plural images falls within a predetermined range (e.g., within ±10%). This image size adjust processing can prevent deterioration of appearance caused by differences in size between images which belongs to one category.

In a step S810, the CPU 60 regenerates all content group property information, based on information of the digital content output subjected to the image size adjust processing. The CPU 60 further overwrites (updates) content group property information before the image size-adjust processing with the regenerated content group property information.

In a step S812, the CPU 60 executes a font size adjust processing on the digital content output subjected to the image size adjust processing. The image size adjust processing is to adjust font sizes of texts to adequate sizes. The image size adjust processing is a combination of one or two or more of the following processing I to III. In the processing I, font sizes are matched one another if plural texts which belong to one category have different font sizes respectively. The processing II reduces a font size, for example, when a font size of a text laid out is too large to fit in a range of region given to a category concerned. The processing III enlarges a font size if a size of a text laid out is too small. A layout can have a visual consistency through this processing.

In a step S814, the CPU 60 regenerates content group property information, based on information of digital content output subjected to a font size adjust processing. Further, the CPU 60 overwrites (updates) content group property information before the image size adjust processing with the regenerated content group property information.

In a step S816, the CPU 60 executes a font type adjust processing on the digital content sets subjected to the font size adjust processing. The font type adjust processing matches font types to one consistent type if different font types are used in plural texts which belong to one category. The font type adjust processing includes, for example, a processing for matching different font types to a font type of most used characters or a processing for matching different font types to a predetermined font type. By this processing, a layout can attain consistency like by adjustment of font sizes described above.

In a step S818, the CPU 60 regenerates all content group property information, based on information of the digital content output subjected to the font type adjust processing. The CPU 60 further overwrites (updates) content group property information before the font type adjust processing with the regenerated content group property information.

In a step S820, the CPU 60 executes a color adjust processing on the digital content sets subjected to the font type adjust processing. The color adjust processing adjusts total color balance of the whole digital content sets. The color adjust processing is carried out based on color distribution information as an element of the content group property information. For example, if digital content sets have large color differences between one another, colors of the respective digital content sets are adjusted so as to reduce the color differences. By this color adjust processing, the whole digital content sets laid out in a setting region can have a consistency in color tones. Accordingly, a layout can be corrected to attain a better appearance. If a template defines a coloring rule, color tones can be adjusted according to the defined color rule.

In a step S822, the CPU 60 regenerates content group property information, based on information of the digital content output subjected to the color adjust processing. The CPU 60 further overwrites (updates) content group property information before the color adjust processing with the regenerated content group property information.

1-4. Overlap Remove Processing

Described next will be details of the overlap remove processing in the step S800 in the layout adjust processing shown in FIG. 15.

Figure 16:
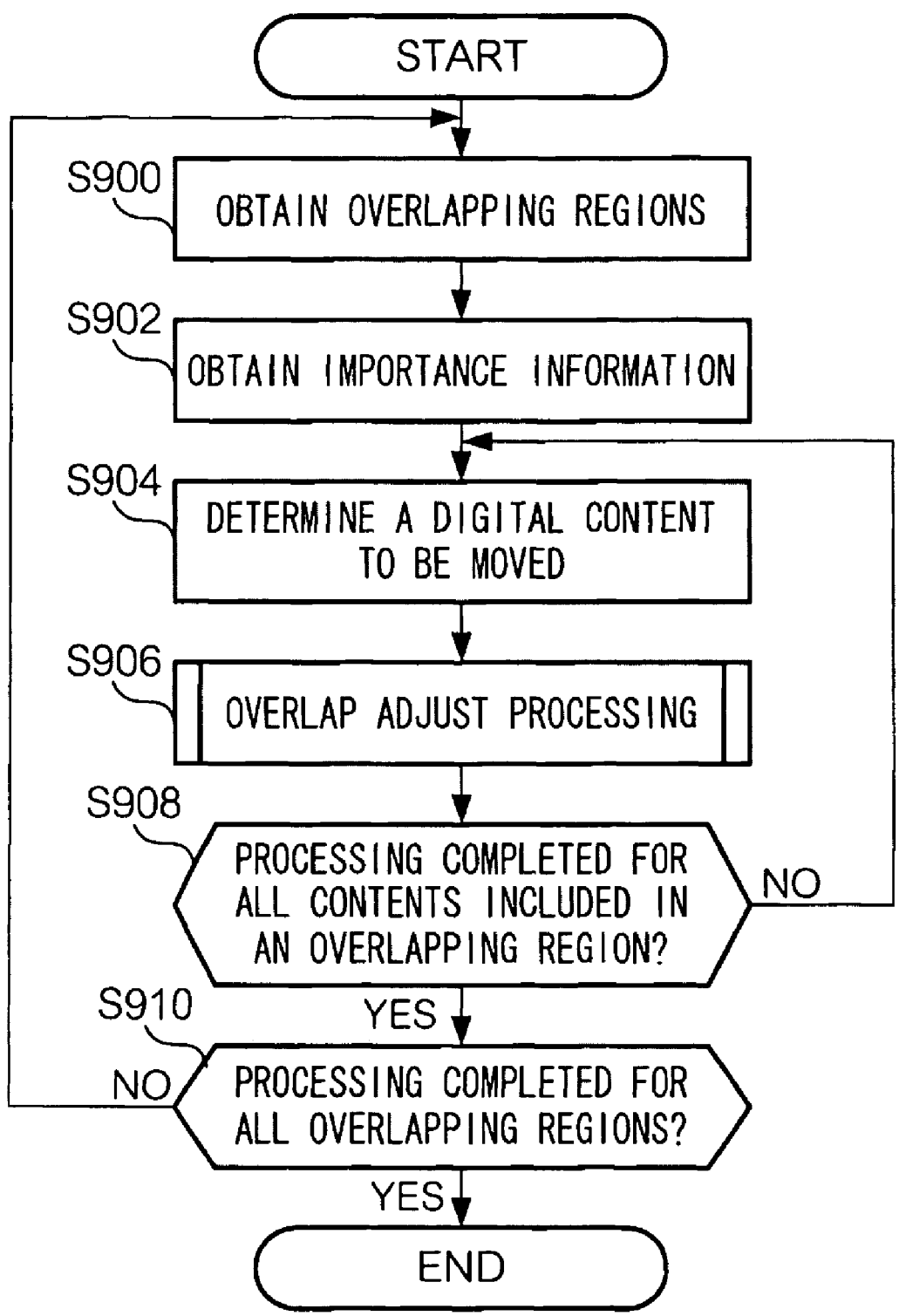
FIG. 16 is a flowchart showing details of an overlap remove processing.

FIG. 16 is a flowchart showing details of the overlap remove processing. In a step S900, the CPU 60 obtains overlap information. Next in a step S902, the CPU 60 obtains importance information. Next in a step S904, the CPU 60 determines a digital content set to be moved. The digital content set to be moved is determined based on the importance information. More specifically, the CPU 60 determines, for example, a digital content set having the lowest importance as the digital content set to be moved among unprocessed ones of digital content sets causing overlap. Next in a step S906, the CPU 60 performs an overlap adjust processing on the digital content set to be moved. Details of the overlap adjust processing will be described later.

Next in a step S908, the CPU 60 determines whether the above processing is complete for all digital content sets included in an overlapping region. If the above processing is determined to be not complete for all the digital content sets (S908: NO), the CPU 60 repeatedly executes the processing from the steps S904 to S906. Otherwise, if the above processing is completed for all the digital content sets (S908: YES), the CPU 60 advances the processing to a step S910. In the step S910, the CPU 60 determines whether the above processing is complete for all overlapping regions. If the above processing is determined to be not complete for all the overlapping regions (S910: NO), the CPU 60 repeatedly executes the processing of the steps S900 to S908. If the above processing is complete for all the overlapping regions (S910: YES), the CPU 60 terminates the overlap remove processing.

Figure 17:
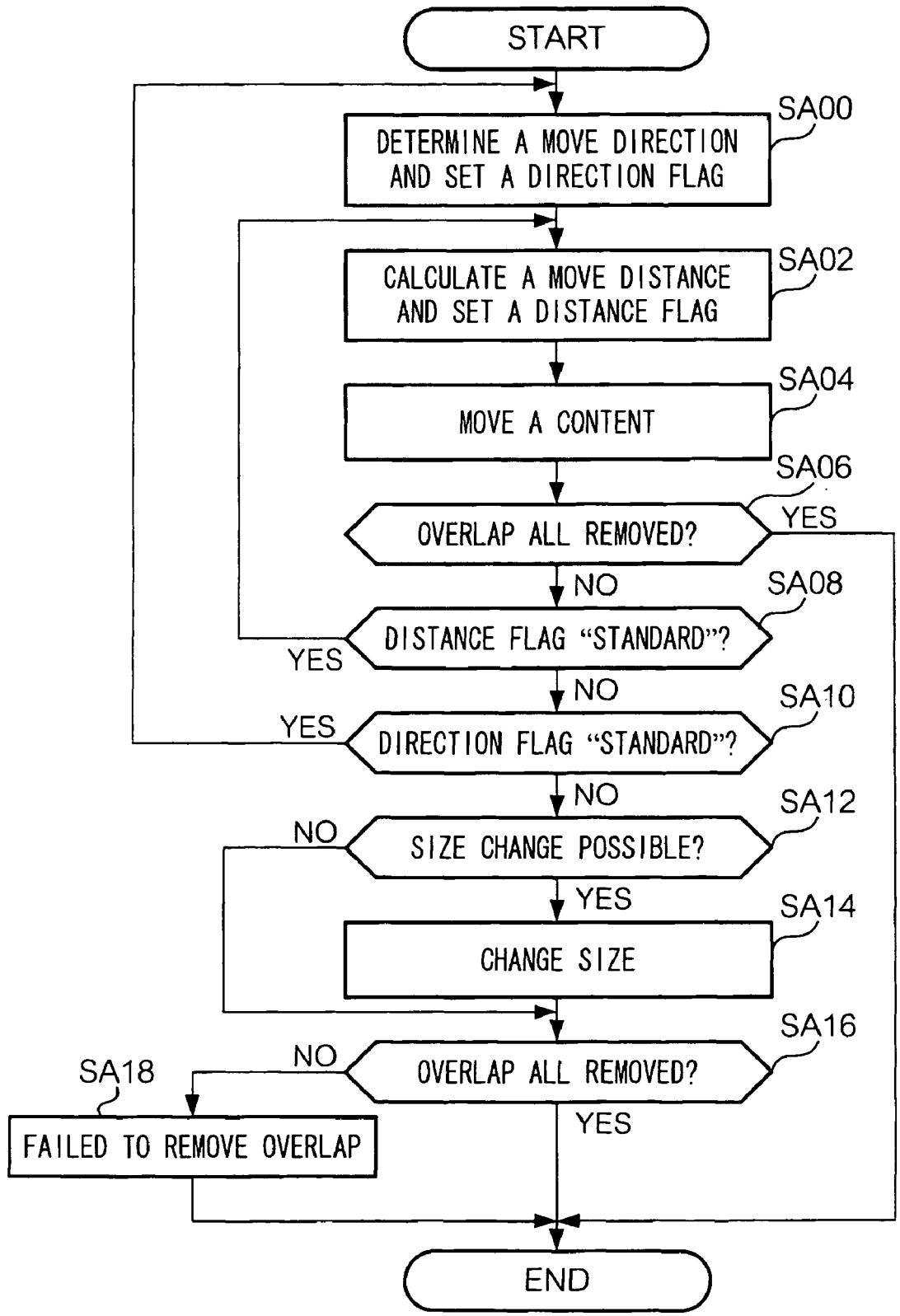
FIG. 17 is a flowchart showing details of an overlap adjust processing.

FIG. 17 is a flowchart showing details of the overlap adjust processing in the step S906 in FIG. 16. The CPU 60 first initializes values of a distance flag and a direction flag to zero. In a step SA00, the CPU 60 determines a move direction of a move-target digital content set to be moved. The CPU 60 determines first whether the value of the direction flag is "standard" or not. The value of the direction flag is now zero and therefore determined to be not "standard". In this case, for example, determination of the move direction is carried out in a procedure as follows. (I) The CPU 60 obtains first a circumscribed quadrangle of an overlapping region. The circumscribed quadrangle is a rectangle having major and minor edges each being parallel to either the x-axis or y-axis. (II) Next, the CPU 60 determines directions parallel to minor edges of the overlapping region, as candidates of the move direction. The minor edges are parallel to either the x- or y-axis. Therefore, candidates of the move direction are two of positive and negative directions of the x-axis or y-axis. (III) the CPU 60 determines as the move direction a direction which allows the move-target digital content set to move increasing a distance between centroids of the overlapping region and the move-target digital content set. This method of determination is referred to as a "first determination method" hereinafter. After determining the move direction, the CPU 60 changes the value of the direction flag to "standard".

Alternatively, determination of the move direction can be carried out in the following procedure. (I) The CPU 60 first obtains a circumscribed quadrangle of an overlapping region. (II) The CPU 60 calculates a direction vector of a line extending through two points, i.e., centroids of the overlapping region and the move-target digital content set to be moved. The CPU 60 determines positive and negative directions of the calculated direction vector as candidates for the move direction. (III) The CPU 60 determines as the move direction one of the candidates determined by the process (II) which allows the move-target digital content set to move increasing a distance between the centroids of the overlapping region and the move-target digital content set to be moved. This method of determination is referred to as a "second determination method". According to this method, the move direction is not limited to a direction parallel to the x- or y-axis but can be an oblique direction.

Next in a step SA02, the CPU 60 calculates a move distance. The move distance is calculated as follows. The CPU 60 first determines the value of a distance flag is "shortest" or not. Since the value of the distance flag is now zero, the value of the distance flag is determined to be not the "shortest". In this case, the CPU 60 obtains a circumscribed quadrangle of the move-target digital content set to be moved. The CPU 60 calculates as the move distance the shortest move distance which causes the circumscribed quadrangle of the move-target digital content set to go outside the circumscribed quadrangle of the overlapping region, or in other words, a minimum distance by which the move-target digital content set is moved so that the circumscribed quadrangles of the move-target digital content set and the overlapping region do not overlap any more. After calculating the move distance, the CPU 60 changes the value of the distance flag to "shortest".

Next in a step SA04, the CPU 60 moves the target content set for the calculated move distance in the determined move direction. Next in a step SA06, the CPU 60 determines whether overlap between digital content sets have been eliminated or not. If all overlap are determined to have been eliminated (SA06: YES), the CPU 60 terminates the overlap adjust processing. Otherwise, if all overlap are determined to have not been eliminated (SA06: NO), the CPU 60 advances the processing to a step SA08.

In the step SA08, the CPU 60 determines whether the value of the distance flag is "shortest" or not. If the value of the distance flag is determined to be "shortest" (SA08: YES), the CPU 60 returns the processing to the step SA02 again. In the step SA02, the CPU 60 determines the value of the distance flag is "shortest" or not. The value of the distance flag is now "shortest". In this case, the CPU 60 obtains a circumscribed quadrangle of a non-target content set to be not moved. The CPU 60 calculates as the move distance the shortest move distance which causes the circumscribed quadrangle of the move-target digital content set to go outside the circumscribed quadrangle of the non-move-target digital content set, or in other words, a minimum distance by which the move-target digital content set is moved so that the circumscribed quadrangles of the target and non-move-target digital content sets do not overlap any more. After calculating this move distance, the CPU 60 moves the move-target digital content set in the step SA04. The CPU 60 determines again whether overlap between digital content sets have been eliminated.

In the step SA08, the CPU 60 determines again whether the value of the distance flag is "shortest" or not. If the value of the distance flag is determined to be not "shortest" (SA08: NO), the CPU 60 then determines whether the value is "standard" or not. The value of the distance flag is now "standard". In this case, the CPU 60 returns the processing again to the step SA00. In the step SA00, the CPU 60 determines as a new move direction a direction perpendicular to the previous calculated move direction. The CPU 60 executes the processing of steps SA02 to SA10 using the new move direction.

Through the processing as described above, a total of four combinations of two move directions by two move distances are attempted at most. If overlap of digital content sets cannot be removed even with any of these combinations, the CPU 60 advances the processing to a step SA12. In the step SA12, the CPU 60 determines whether size of the move-target digital content set can be changed or not. Each digital content set is associated with a flag indicative of whether size can be changed or not. Based on this flag, the CPU 60 determines whether the size can be changed or not. If the size is determined to be changeable (SA12: YES), the CPU 60 changes the size of the move-target digital content set. More specifically, the CPU 60 reduces the size of the move-target digital content set at a predetermined reduction rate. Alternatively, the CPU 60 can determine a reduction rate so that the move-target digital content set is contained in a blank region.

In a step SA16, the CPU 60 determines whether overlap of digital content sets have been removed. If overlap is determined to have been removed (SA16: YES), the CPU 60 terminates the overlap adjust processing. If overlap is determined to have not been removed (SA16: NO), the CPU 60 determines a failure in removal of overlap. In a step SA18, the CPU 60 controls the display to show a message such as "unable to remove overlap".

After size of the move-target digital content set is changed in the step SA14, the processing of the steps SA00 to SA10 can be performed again to try to move the digital content set.

FIGS. 18A to 18D more specifically depict the overlap remove processing according to this embodiment. FIGS. 18 show an example which determines a move direction according to the first determination method described previously. In FIG. 18A, digital content sets DA1 and DC2 cause an overlap.

A hatched region in the figure is an overlapping region. Now will be described a case that the digital content set DC1 is a move-target digital content set to be moved. In this situation, at first, a circumscribed quadrangle of the overlapping region is obtained. FIG. 18B shows the circumscribed quadrangle E of the overlapping region. Subsequently, directions of a minor edge of the circumscribed quadrangle are determined as candidates for the move direction. In the example of FIG. 18B, positive and negative directions of the x-axis are candidates for the move direction. One of these candidates which increases a distance between a centroid $G_E$ of the overlapping region and a centroid $G_D$ of the move-target digital content set is determined as the move direction. That is, the positive x-axis direction is determined as the move direction (A-direction in FIG. 18C). The digital content set DC1 as a move-target digital content set to be moved is moved in the move direction by a distance which removes an overlap between the circumscribed quadrangle E and the digital content set DC1 (FIG. 18D).

FIGS. 19A to 19D also more specifically depict the overlap remove processing according to this embodiment. FIGS. 19 show an example which determines a move direction according to the second determination method described previously. FIGS. 19A and 19B are the same as FIGS. 18A and 18B. Directions (two of positive and negative directions) parallel to a line (drawn as a one-dot chain line in FIG. 19C) extending through a centroid $G_E$ of an overlapping region and a centroid $G_{DC1}$ is determined as candidates for a move direction. One of these candidates which increases a distance between the centroid $G_E$ of the overlapping region and the centroid $G_{DC1}$ of the move-target digital content set is determined as the move direction. That is, the B-direction shown in FIG. 19C is determined as the move direction. The digital content set DC1 as a move-target digital content set to be moved is moved in the move direction by a distance which removes an overlap between the circumscribed quadrangle E and the digital content set DC1 (FIG. 19D).

Figure 20A:
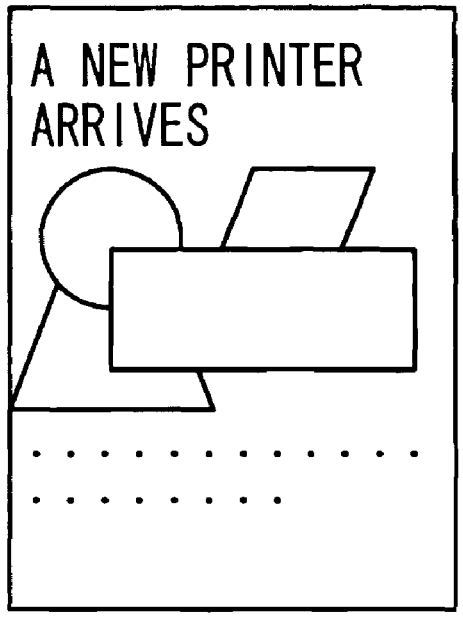
FIG. 20 show examples of specific results of the overlap remove processing.
Figure 20B:
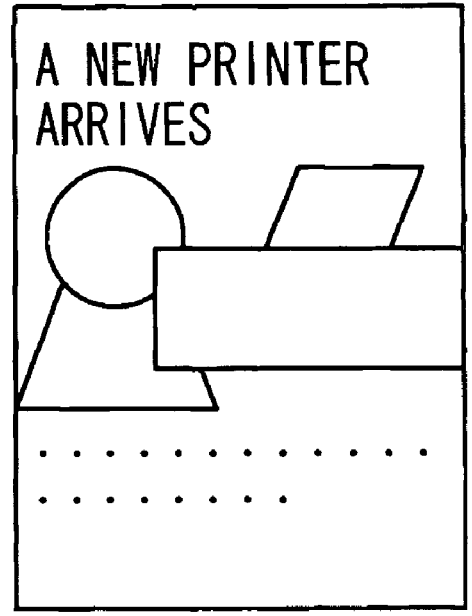
Figure 20C:
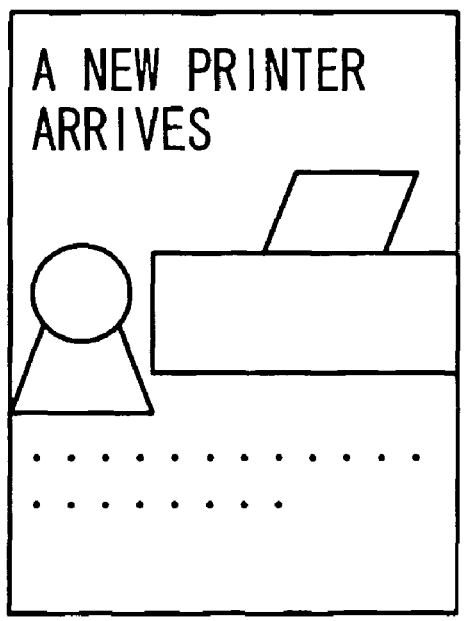

FIGS. 20 show examples of specific results of the overlap remove processing. FIG. 20A shows digital content output generated as an initial layout. In the initial layout, a human image and an image of a printer cause an overlap. FIG. 20B shows a result of adjusting an overlap according to related art. Since there is no or small blank space in the right side of the printer image, the overlap of content sets cannot be removed merely by moving the printer image in a predetermined direction. FIG. 20C shows a result of adjusting an overlap according to the present embodiment. Even when an overlap cannot be removed merely by moving a content set, the overlap can be removed by size reduction (or a combination of a size reduction and a move). In the example of FIG. 20C, size of a human image is reduced.

2. Second Embodiment

The second embodiment of the invention will now be described. In the description below, componential elements and features common to the first embodiment will be omitted, and differences from the first embodiment will be described mainly. Common elements to the first embodiment will be denoted at common reference numerals. The second embodiment differs from the first embodiment in that the digital content creation device 100 does not have the functions of the content group property information generation section 13. In the second embodiment, necessary information is calculated when needed.

Figure 21:
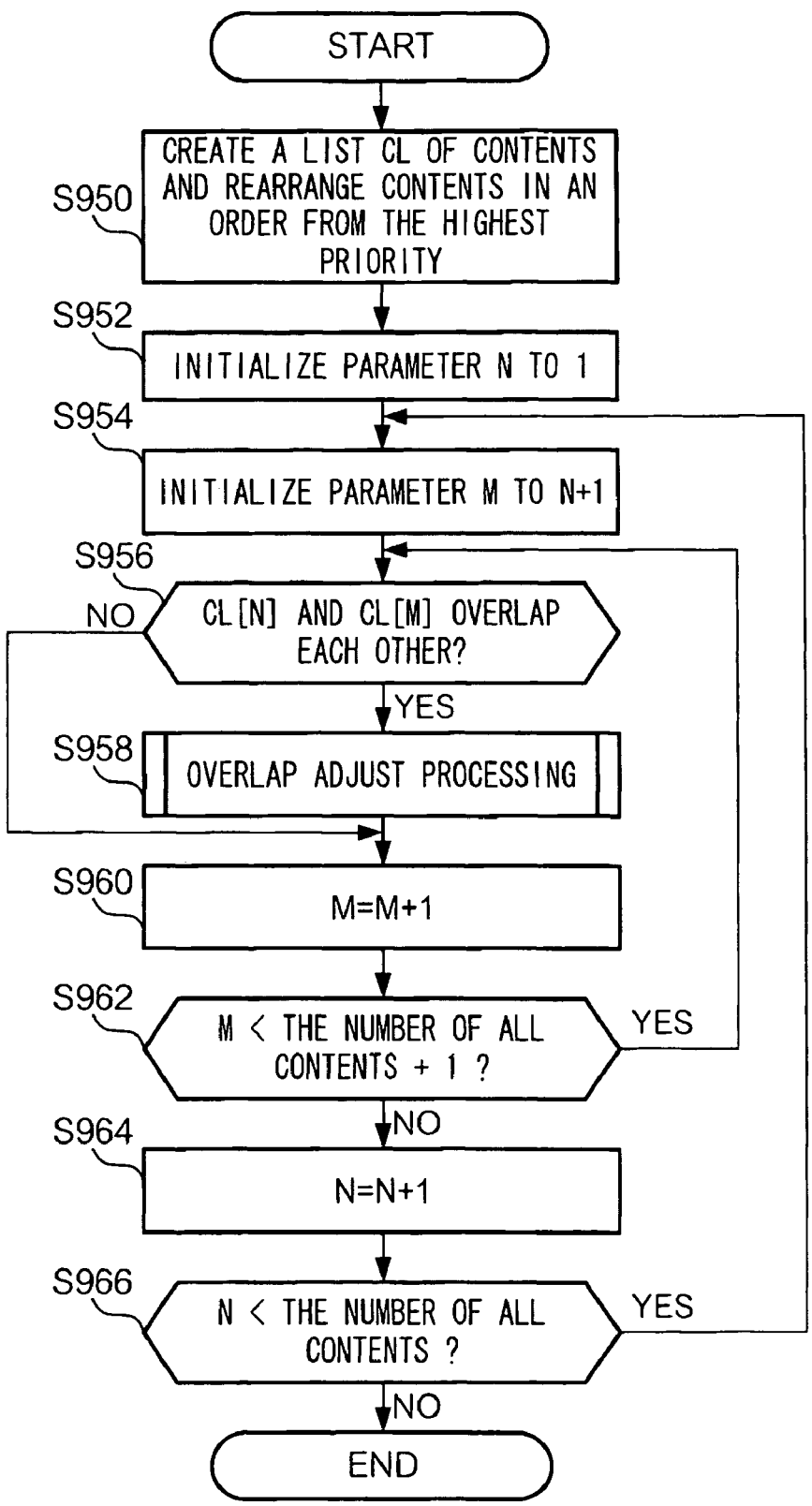
FIG. 21 is a flowchart showing details of an overlap remove processing according to the second embodiment.

FIG. 21 is a flowchart showing details of an overlap remove processing according to the second embodiment. In a step S950, the CPU 60 creates a list CL of digital content sets laid out in a setting region. The CPU 60 further rearranges the digital content sets in the list on the basis of priority information given to each of the digital content sets. In the list, the content sets are rearranged in an order from the highest priority. Thus in the list CL, the digital content sets are arranged in a descending order of priorities. In the description below, a digital content set having an N-th priority is referred to as CL(N) in the list CL.

Next in a step S952, the CPU 60 initializes to N=1 a parameter N for use in processing. Next in a step S954, the CPU 60 initializes to M=N+1 a parameter M for use in processing. Next in a step S956, the CPU 60 determines whether CL(N) and CL(M) overlap each other. If CL(N) and CL(M) are determined to be overlapping each other (S956: YES), the CPU 60 performs an overlap adjust processing in a step S958. Details of the overlap adjust processing is the same as those described in the first embodiment and will be omitted herefrom. Upon completion of the overlap adjust processing, the CPU 60 advances the processing to a step S960. Even if CL(N) and CL(M) are determined to be not overlapping each other, the CPU 60 also advances the processing to the step S960.

In the step S960, the CPU 60 updates the parameter M to M=M+1. Next in a step S962, the CPU 60 determines whether the parameter M satisfies a predetermined condition or not, e.g., whether M<K+1 is satisfied in this case. Note that K is the number of digital content sets included in a setting region. If M<K+1 is satisfied (S962: YES), the CPU 60 repeatedly executes the processing of the steps S956 to S960. Otherwise, if M=K+1 (S962: NO), e.g., if an overlap remove processing is complete using CL(N) as a reference, the CPU 60 updates the parameter N to N=N+1. Next in a step S966, the CPU 60 determines whether the parameter N satisfies N<K or not, i.e., whether the processing is complete for all the digital content sets. If N<K is satisfied (S966: YES), i.e., if the processing is not complete for all the digital content sets, the CPU 60 repeatedly executes the processing of the steps S954 to S964. Upon completion of the processing for all the digital content sets (S966: NO), the CPU 60 terminates the overlap remove processing.

As described above, the digital content creation device according to the second embodiment generates a content list which associates digital content sets included in a setting region with priorities thereof. This digital content creation device performs a overlap remove processing based on the content list. As a result, digital content sets having lower priorities than a priority of a digital content set regarded as a reference are moved and/or reduced in size.

3. Further Embodiments

The invention is not limited to the embodiment but can be variously modified in practice.

Figure 22:
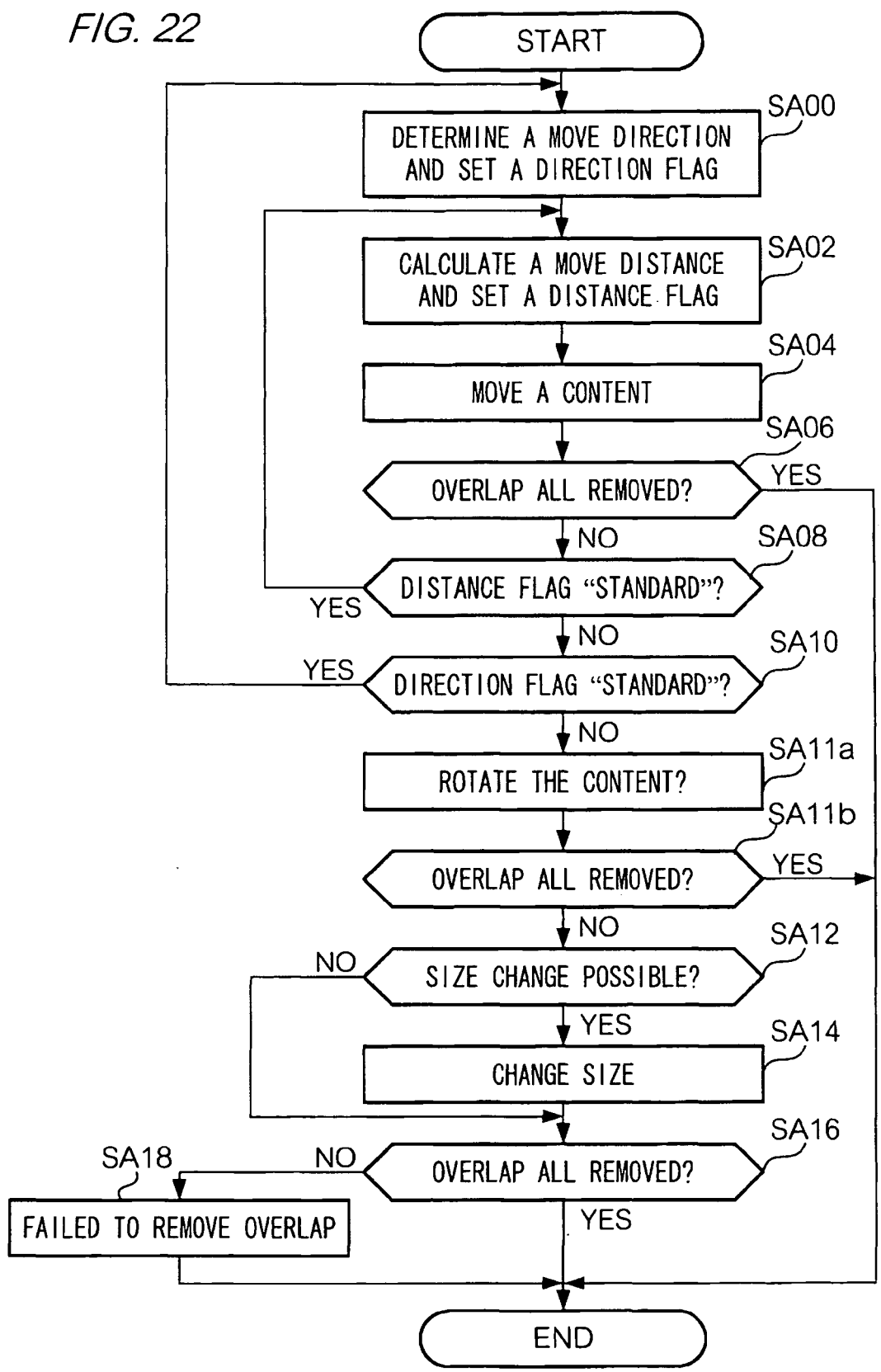
FIG. 22 is a flowchart showing details of an overlap adjust processing according to another embodiment

FIG. 22 is a flowchart showing details of an overlap adjust processing according to another embodiment. The flowchart of FIG. 22 differs from that of FIG. 18 in that FIG. 22 includes steps SA11a and SA11b between steps SA10 and SA12. In the first embodiment, the digital content creation device 100 removes an overlap by a move and/or reduction in size. In the present embodiment, the digital content creation device 100 removes an overlap by a rotation, move, and/or reduction in size.

Further, to determine a move distance, the digital content creation device 100 in the first embodiment uses sizes of an overlapping region and a move-target digital content set to be moved. However, the digital content creation device 100 can use black region information included in content group property information, to determine a move distance.

Also in each of the above embodiments, the digital content creation device 100 removes an overlap by moving or reducing in size a content set having a lower importance (or priority). However, when an overlap cannot be removed by moving or reducing in size a content set having a lower importance, the digital content creation device 100 can remove the overlap by moving or reducing in size a digital content set having a higher importance (or priority).

Also in each of the above embodiments, the digital content creation device 100 can stores in advance a threshold value for a reduction rate to reduce size of a digital content set. When carrying out a size reduction processing, the digital content creation device 100 reduces a digital content set in size so that the reduction rate does not exceed the threshold value. If size of a digital content set is reduced too much, visibility degrades adversely. Restriction of the reduction rate by a threshold value is therefore effective.

Each of the above embodiments has been described with reference to an exemplary case that one single digital content creation device 100 has all the functions shown in FIG. 1. The functions shown in FIG. 1 can be allotted to two or more devices. For example, a digital content creation system including two or more devices can be configured to have the functions shown in FIG. 1. Alternatively, an image forming device such as an inkjet printer can be configured to have the functions shown in FIG. 1.

What is claimed is:

1. A digital content creation device, comprising:
a processor; and
a storage device, wherein:
the storage device is configured to store a content database that includes a plurality of digital content sets;
the processor is configured to select from among the stored plurality of digital content sets at least one target digital content set for processing;
the processor is further configured to determine, based on a predetermined template or a selected template in accordance with a template select instruction, a layout for more than one target selected digital content set;
the processor is further configured to generate property information for the more than one target selected digital content set, based on the layout determined by the processor, the property information including overlap information indicative of an overlap state of the more than one target selected digital content set, and including importance information indicative of a relative importance of each of the more than one target selected digital content set;
the processor is further configured to detect, based on the overlap information included in the property information generated by the processor, an overlapping region where overlap exists between the more than one target selected digital content set;
the processor is further configured to determine, based on the importance information included in the property information generated by the processor, at least one of the more than one target selected digital content set as a move-target digital content set to be moved;
the processor is further configured to determine a move direction for the move-target digital content set to be moved, the move direction parallel to a line connecting a centroid of the overlapping region and a centroid of the move-target digital content set, the parallel direction allowing the centroid of the move-target digital content set and the centroid of the overlapping region to move away from each other;
the processor is further configured to calculate a move-distance for the move-target digital content set to be moved in the move direction determined by the processor, so as to remove overlap between the move-target digital content set and a quadrangle circumscribed on the overlapping region; and
the processor is further configured to move the move-target digital content set in the move direction determined by the processor by the move distance calculated by the processor.

2. The digital content creation device according to claim 1, wherein the
processor is further configured to calculate two move distances, one of the two move distances being required for the move-target digital content set to move out of the overlapping region, and the other of the two move distances being required for the move-target digital content set to remove overlap between the move-target digital content set and the other digital content sets of the more than one target selected digital content set.

3. The digital content creation device according to claim 1, wherein
the processor is further configured to determine whether the overlap between the more than one target selected digital content set can be removed by moving the move-target digital content set in the direction determined by the processor, and
change the move direction if the processor determines that the overlap cannot be removed.

4. The digital content creation device according to claim 1, wherein
the processor is further configured to determine whether the overlap between the more than one target selected digital content set can be removed by moving the move-target digital content set in the direction determined by the processor; and
reduce size of the move-target digital content set if the processor determines that the overlap cannot be removed.

5. The digital content creation device according to claim 4, wherein
the processor is further configured to determine whether the overlap between the more than one target selected digital content sets can be removed by the reduction of the size, and
rotate the move-target digital content set if the processor determines that the overlap cannot be removed.

6. The digital content creation device according to claim 1, wherein
the processor is further configured to determine whether the overlap between the more than one target selected digital content sets can be removed by moving the move-target digital content set in the direction determined by the processor; and
determine as a new move-target digital content set at least another target digital content set other than target digital content sets having importance information indicative of a lowermost importance.

7. A digital content creation device, comprising:
a processor; and
a storage device, wherein:
the storage device is configured to store a content database that includes a plurality of digital content sets;

the processor is configured to select from among the stored plurality of digital content sets more than one target digital content set for processing;

the processor is further configured to determine, based on a predetermined template or a selected template in accordance with a template select instruction input by the user, a layout for the more than one target selected digital content set;

the storage device is further configured to store property information for the more than one target selected digital content set, the property information including overlap information indicative of an overlap state of the more than one target selected digital content set, and including importance information indicative of a relative importance of each of the more than one target selected digital content set;

the processor is further configured to detect, based on the overlap information included in the property information stored in the storage section, a region where overlap exists between the more than one target selected digital content set;

the processor is further configured to determine, based on the importance information included in the property information stored in the storage device, at least one of the more than one target selected digital content set as a move-target digital content set to be moved;

the processor is further configured to determine a move direction for the move-target digital content set to be moved, the move direction being a direction parallel to a line connecting a centroid of the overlapping region and a centroid of the move-target digital content set, the parallel direction allowing the centroid of the move-target digital content set and the centroid of the overlapping region to move away from each other;

the processor is further configured to calculate a move-distance for the move-target digital content set to be moved in the move direction determined by the processor so as to remove overlap between the move-target digital content set and a quadrangle circumscribed on the overlapping region; and the processor is further configured to move the move-target digital content set in the move direction determined by the move direction determination section by the move distance calculated by the move-distance calculation section.

8. The digital content creation device according to claim 7, wherein the processor is further configured to calculate two move distances, one of the two move distances being required for the move-target digital content set to move out of the overlapping region, and the other of the two move distances being required for the move-target digital content set to remove overlap between the move-target digital content set and the other digital content sets of the more than one target selected digital content set.

9. The digital content creation device according to claim 7, wherein the processor is further configured to determine whether the overlap between the more than one target selected digital content set can be removed by moving the move-target digital content set in the direction determined by the processor; and change the move direction if the processor determines that the overlap cannot be removed.

10. The digital content creation device according to claim 7, wherein the processor is further configured to determine whether the overlap between the more than one target selected digital content set can be removed by moving the move-target digital content set in the direction determined by the processor; and reduce size of the move-target digital content set if the processor determines that the overlap cannot be removed.

11. The digital content creation device according to claim 10, wherein the processor is further configured to determine whether the overlap between the more than one target selected digital content sets can be removed by the reduction of the size, and rotate the move-target digital content set if the processor determines that the overlap cannot be removed.

12. The digital content creation device according to claim 7, wherein the processor is further configured to determine whether the overlap between the more than one target selected digital content set can be removed by moving the move-target digital content set in the direction determined by the processor; and determine as a new move-target digital content set at least another target digital content set other than target digital content sets having importance information indicative of a lowermost importance.

13. A digital content creation method, comprising:

selecting, by a processor from among a plurality of digital content sets included in a content database stored in a storage device at least one target digital content set for processing;

determining, by the processor, based on a predetermined template or selected in accordance with a template select instruction input by the user, a layout for the more than one target selected digital content set;

generating, by the processor, property information for the more than one target selected digital content set, based on the layout, the property information including overlap information indicative of an overlap state of the more than one target selected digital content sets, and including importance information indicative of a relative importance of each of the more than one target selected digital content set;

detecting, by the processor, based on the overlap information included in the property information, a region where overlap exists between the more than one target selected digital content sets;

determining, by the processor, based on the importance information included in the property information, at least one of the more than one target selected digital content set as a move-target digital content set to be moved;

determining, by the processor, a move direction for the move-target digital content set to be moved, the move direction being a direction parallel to a line connecting a centroid of the overlapping region and a centroid of the move-target digital content set, the parallel direction allowing the centroid of the move-target digital content set and the centroid of the overlapping region to move away from each other;

calculating, by the processor, a move-distance for the move-target digital content set to be moved in the move direction, so as to remove overlap between the move-target digital content set and a quadrangle circumscribed on the overlapping region; and moving, by the processor, the move-target digital content set in the move direction by the move distance.

14. A digital content creation method, comprising:
- selecting, by a processor, from among a plurality of digital content sets included in a content database stored in a storage device at least one target digital content set for processing;
- determining, by the processor, based on a predetermined template or selected in accordance with a template select instruction input by the user, a layout for the more than one target selected digital content set;
- detecting, by the processor, based on the overlap information included in property information, an overlapping region where overlap exists between the more than one target selected digital content set, the property information being stored in a storage section and including overlap information indicative of an overlap state of the more than one target selected digital content set, and including importance information indicative of a relative importance of each of the more than one target selected digital content set;
- determining, by the processor, based on the importance information included in the property information, one of the more than one target selected digital content set as a move-target digital content set to be moved, the importance information for the determined set indicating a lowermost importance;
- determining, by the processor, a move direction for the move-target digital content set to be moved, the move direction being a direction parallel to a line connecting a centroid of the overlapping region and a centroid of the move-target digital content set, the parallel direction allowing the centroid of the move-target digital content set and the centroid of the overlapping region to move away from each other;
- calculating, by the processor, a move-distance for the move-target digital content set to be moved in the move direction, so as to remove overlap between the move-target digital content set and a quadrangle circumscribed on the overlapping region; and
- moving, by the processor, the move-target digital content set in the move direction by the move distance.

15. A program product that causes a computer having a processor and a storage device to execute a process, the process comprising:
- selecting, by the processor, from among a plurality of digital content sets included in a content database stored in the storage device at least one target digital content set for processing;
- determining, by the processor, based on a predetermined template selected or in accordance with a template select instruction input by the user, a layout for the more than one target selected digital content set;
- generating, by the processor, property information for the more than one target selected digital content set, based on the layout, the property information including overlap information indicative of an overlap state of the more than one target selected digital content set, and including importance information indicative of a relative importance of each of the more than one target selected digital content set;
- detecting, by the processor, based on the overlap information included in the property information, an overlapping region where overlap exists between the more than one target selected digital content set;
- determining, by the processor, based on the importance information included in the property information, at least one of the more than one target selected digital content set as a move-target digital content set to be moved;
- determining, by the processor, a move direction for the move-target digital content set to be moved, the move direction being a direction parallel to a line connecting a centroid of the overlapping region and a centroid of the move-target digital content set, the parallel direction allowing the centroid of the move-target digital content set and the centroid of the overlapping region to move away from each other;
- calculating, by the processor, a move-distance for the move-target digital content set to be moved in the move direction, so as to remove overlap between the move-target digital content set and a quadrangle circumscribed on the overlapping region; and
- moving, by the processor, the move-target digital content set in the move direction by the move distance.

16. A program product that causes a computer having a processor and a storage device to execute a process, the process comprising:
- selecting, by the processor, from among a plurality of digital content sets included in a content database stored in the storage device at least one target digital content set for processing;
- determining, by the processor, based on a predetermined template or selected in accordance with a template select instruction input by the user, a layout for the more than one target selected digital content set;
- detecting, by the processor, based on the overlap information included in property information, an overlapping region where overlap exists between the more than one target selected digital content set, the property information being stored in a storage section and including overlap information indicative of an overlap state of the more than one target selected digital content set, and including importance information indicative of a relative importance of each of the more than one target selected digital content set;
- determining, by the processor, based on the importance information included in the property information, one of the more than one target selected digital content set as a move-target digital content set to be moved, the importance information for the determined one indicating a lowermost importance;
- determining, by the processor, a move direction for the move-target digital content set to be moved, the move direction being a direction parallel to a line connecting a centroid of the overlapping region and a centroid of the move-target digital content set, the parallel direction allowing the centroid of the move-target digital content set and the centroid of the overlapping region to move away from each other;
- calculating, by the processor, a move-distance for the move-target digital content set to be moved in the move direction, so as to remove overlap between the move-target digital content set and a quadrangle circumscribed on the overlapping region; and
- moving, by the processor, the move-target digital content set in the move direction by the move distance.

* * * * *